US010444961B2

United States Patent
Niranjani et al.

(10) Patent No.: US 10,444,961 B2
(45) Date of Patent: Oct. 15, 2019

(54) HOVER-BASED INTERACTION WITH RENDERED CONTENT

(71) Applicant: Microsoft Technology Licensing, LLC, Redmond, WA (US)

(72) Inventors: Himanshu Niranjani, Redmond, WA (US); Craig Lichtenstein, Seattle, WA (US); Shailendra Mittal, Bellevue, WA (US); Devin Jensen, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 15/439,808

(22) Filed: Feb. 22, 2017

(65) Prior Publication Data

US 2017/0160914 A1 Jun. 8, 2017

Related U.S. Application Data

(63) Continuation of application No. 14/458,136, filed on Aug. 12, 2014, now Pat. No. 9,594,489.

(51) Int. Cl.
*G06F 3/0484* (2013.01)
*G06F 3/0488* (2013.01)
(Continued)

(52) U.S. Cl.
CPC ........ *G06F 3/04845* (2013.01); *G06F 3/0481* (2013.01); *G06F 3/0482* (2013.01);
(Continued)

(58) Field of Classification Search
CPC ............. G06F 3/04845; G06F 3/04847; G06F 3/04842
See application file for complete search history.

(56) References Cited

U.S. PATENT DOCUMENTS

| 6,501,464 B1 | 12/2002 | Cobbley et al. |
| 7,602,382 B2 | 10/2009 | Hinckley et al. |

(Continued)

FOREIGN PATENT DOCUMENTS

| CN | 101432711 A | 5/2009 |
| CN | 102467344 A | 5/2012 |

(Continued)

OTHER PUBLICATIONS

"Notice of Allowance Issued in U.S. Appl. No. 14/458,136", dated Nov. 3, 2016, 8 Pages.

(Continued)

*Primary Examiner* — Anil K Bhargava
(74) *Attorney, Agent, or Firm* — Arent Fox LLP

(57) ABSTRACT

Disclosed are techniques and systems for enabling "hover-based" interaction with content that is rendered on a display of a viewing device. A process may include rendering content on a display, detecting an object hovering in front of a front surface of the display, and in response to detecting the object, determining a location on the front surface of the display corresponding to a position of the object. The determined location on the front surface of the display may then be used to determine a portion of the content that is rendered at the location or within a threshold distance from the location, and a magnified window of the portion of the content may then be displayed in a region of the display. The portion of the content within the magnified window may be actionable by responding to user input when the user input is provided within the magnified window.

22 Claims, 16 Drawing Sheets

(51) Int. Cl.
 *G06F 3/0481* (2013.01)
 *G06F 3/0482* (2013.01)
 *G06F 3/041* (2006.01)

(52) U.S. Cl.
 CPC ........ *G06F 3/0488* (2013.01); *G06F 3/04842* (2013.01); *G06F 3/04847* (2013.01); *G06F 3/0416* (2013.01); *G06F 2203/04101* (2013.01); *G06F 2203/04805* (2013.01); *G06F 2203/04806* (2013.01)

(56) References Cited

U.S. PATENT DOCUMENTS

| | | |
|---|---|---|
| 7,778,874 B1 | 8/2010 | Saunders |
| 7,877,707 B2 | 1/2011 | Westerman et al. |
| 8,219,936 B2 | 7/2012 | Kim et al. |
| 8,255,836 B1 | 8/2012 | Gildfind |
| 8,314,790 B1 | 11/2012 | Zeiger et al. |
| 8,347,221 B2 | 1/2013 | Griffin et al. |
| 8,381,135 B2 | 2/2013 | Hotelling et al. |
| 8,384,683 B2 | 2/2013 | Luo |
| 8,614,693 B2 | 12/2013 | King et al. |
| 9,645,651 B2 | 5/2017 | Hwang et al. |
| 2003/0020733 A1 | 1/2003 | Yin |
| 2003/0025676 A1 | 2/2003 | Cappendijk |
| 2003/0164861 A1* | 9/2003 | Barbanson ............ G06F 3/0481 715/815 |
| 2006/0016870 A1 | 1/2006 | Bonalle et al. |
| 2006/0022955 A1* | 2/2006 | Kennedy ............... G06F 3/0414 345/173 |
| 2006/0132460 A1 | 6/2006 | Kolmykov-Zotov |
| 2006/0161870 A1 | 7/2006 | Hotelling et al. |
| 2006/0274944 A1 | 12/2006 | Tanaka et al. |
| 2007/0124503 A1 | 5/2007 | Ramos et al. |
| 2007/0268317 A1* | 11/2007 | Banay ................... G06F 3/0481 345/660 |
| 2008/0165141 A1 | 7/2008 | Christie |
| 2008/0168403 A1 | 7/2008 | Westerman et al. |
| 2008/0231610 A1 | 9/2008 | Hotelling et al. |
| 2009/0265670 A1* | 10/2009 | Kim .................... G06F 3/04883 715/863 |
| 2009/0303199 A1 | 12/2009 | Cho et al. |
| 2010/0026723 A1* | 2/2010 | Nishihara ........... G06F 3/04886 345/671 |
| 2010/0090964 A1* | 4/2010 | Soo ....................... G06F 3/0416 345/173 |
| 2010/0277505 A1 | 11/2010 | Ludden et al. |
| 2010/0328351 A1 | 12/2010 | Tan |
| 2011/0141031 A1* | 6/2011 | McCullough ......... G06F 3/0481 345/173 |
| 2011/0261030 A1* | 10/2011 | Bullock .............. G06F 15/0283 345/204 |
| 2012/0105333 A1 | 5/2012 | Maschmeyer et al. |
| 2012/0120002 A1 | 5/2012 | Ota |
| 2012/0166974 A1 | 6/2012 | Elford et al. |
| 2012/0212438 A1 | 8/2012 | Vaisanen |
| 2012/0262398 A1 | 10/2012 | Kim et al. |
| 2012/0262420 A1 | 10/2012 | Sobel et al. |
| 2012/0304133 A1 | 11/2012 | Nan et al. |
| 2012/0306738 A1 | 12/2012 | Yamashita et al. |
| 2013/0050131 A1* | 2/2013 | Lee .................... G08G 1/09626 345/174 |
| 2013/0194314 A1 | 8/2013 | Arrasvuori |
| 2014/0071091 A1 | 3/2014 | Barak et al. |
| 2014/0344753 A1* | 11/2014 | Akasaka ............... G06F 3/0488 715/823 |
| 2015/0089419 A1 | 3/2015 | Hwang et al. |
| 2015/0277760 A1* | 10/2015 | Tagaya ................... H04M 1/00 715/711 |
| 2016/0048304 A1 | 2/2016 | Niranjani et al. |
| 2017/0228150 A1 | 8/2017 | Hwang et al. |

FOREIGN PATENT DOCUMENTS

| | | |
|---|---|---|
| CN | 102719990 A | 10/2012 |
| CN | 103858085 A | 6/2014 |
| JP | 2006343856 A | 12/2006 |
| JP | 2010521025 A | 6/2010 |
| JP | 2010268462 A | 11/2010 |
| JP | 2012166176 A | 9/2012 |
| JP | 2012168932 A | 9/2012 |
| JP | 2012248066 A | 12/2012 |
| RU | 2455676 C2 | 7/2012 |
| WO | WO2013113360 A | 8/2013 |

OTHER PUBLICATIONS

U.S. Appl. No. 13/801,665, Dai et al., "Hover Gestures for Touch Enabled Devices", filed Mar. 13, 2013.
U.S. Appl. No. 13/918,238, Viswanathan et al., "Performing an Action on a Touch-Enabled Davise Based on Gesture", filed Jun. 14, 2013.
U.S. Appl. No. 14/027,533, Hawang, et al., "Hover Controlled User Interface Element", filed Sep. 16, 2013.
U.S. Appl. No. 14/035,888, Rodriguez et al., "Presentation of a Control Interface on a Touch-Enabled Device Based on a Motion or Absence Thereof", filed Sep. 24, 2013.
U.S. Appl. No. 14/138,238, Schriver et al., "Multiple Hover Point Gestures", filed Dec. 23, 2013.
U.S. Appl. No. 14/152,838, Dai et al., "Increasing Touch and/or Hover Accuracy on a Touch-Enabled Device", filed Jan. 10, 2014.
Chen, "uTouch: Sensing Touch Gestures on Unmodified LCDs", In ACM Special Interest Group on Computer-Human Interaction (Chi'13), Apr.-May 2013, 4 pages.
Crook, "Samsung Galaxy S4 Beats the Best With 5-inch, 1080p Display, 1.9GHz Processor, Gesture Controls and a Q2 2013 Release", Retrieved from <<http://techcrunch.com/2013/03/14/samsung-galaxy-s-4-beats-the-best-with-5-inch-1080p-display-1-9ghz-processor-gesture-controls-and-a-q2-2013-release/>>, Mar. 2013, 7 pages.
"Floating Touch", Retrieved from <<http://developer.sonymobile.com/knowledge-base/technologies/floating-touch/>>, published Sep. 2012, 2 pages.
"Gestures, Manipulations, and Interactions (Windows Store apps)", Retrieved on Apr. 24, 2013 from <<http://msdn.microsoft.com/en-in/library/windows/apps/hh761498.aspx>>, 8 pages.
GSMArena, "Samsung Galaxy Note II Review: Writing Home", Retrieved from <<http://www.gsmarena.com/samsung_galaxy_note_ii-review-824p10.php>>, Oct. 2012, 3 pages.
International Preliminary Report on Patentability Issued in PCT Application No. PCT/US2015/044406, dated Sep. 23, 2016, 12 Pages.
Moghaddam, "Return of hover, what does it mean for the web", Retrieved from <<http://arasbm.com/return-of-hover-and-the-web/>>, Jan. 2014, 11 pages.
Office Action for U.S. Appl. No. 14/458,136, dated Jul. 15, 2016, Niranjani et al., "Hover-Based Interaction With Rendered Content ", 16 pages.
PCT Search Report & Written Opinion for Application No. PCT/US2015/044406, dated Nov. 13, 2015, 11 pages.
Purcher, "Apple Considers New Hovering Capabilities for Future iOS Displays", Retrieved from <<http://www.patentlyapple.com/patently-apple/2011/02/apple-considers-new-hovering-capabilities-for-future-ios-displays.html>>, Feb. 2011, 11 pages.
"Office Action Issued in Philippines Patent Application No. 1-2016-500257", dated Apr. 26, 2018, 2 Pages.
"Final Office Action Issued in U.S. Appl. No. 14/035,888", dated Feb. 26, 2016, 24 Pages.
"Non-Final Office Action Issued in U.S. Appl. No. 14/035,888", dated Jun. 30, 2016, 25 Pages.
"Non-Final Office Action Issued in U.S. Appl. No. 14/035,888", dated Oct. 14, 2015, 18 Pages.
"International Search Report & Written Opinion Issued in PCT Patent Application No. PCT/US2014/056423", dated Dec. 12, 2014, 9 Pages.

(56) References Cited

OTHER PUBLICATIONS

"Office Action Issued in Colombian Patent Application No. 16-77532", dated Dec. 27, 2017, 12 Pages.
"Office Action Issued in Colombian Patent Application No. 16-77532", dated May 24, 2016, 3 Pages.
"Office Action Issued in Chinese Patent Application No. 201480051007.4", dated Apr. 3, 2018, 19 Pages.
"Office Action Issued in Chinese Patent Application No. 201480052612.3", dated Apr. 28, 2018, 19 Pages.
"Office Action Issued in Russian Patent Application No. 2016110571", dated Jul. 3, 2018, 7 Pages.
"Office Action Issued in Japanese Patent Application No. 2016-543999", dated Sep. 5, 2018, 13 Pages.
Takeoka, et al., "Z-touch: An Infrastructure for 3D Gesture Interaction in the Proximity of Tabletop Surfaces", In Proceedings of ACM International Conference on Interactive Tabletops and Surfaces, Nov. 7, 2010, pp. 91-94.
"Office Action Issued in Chilean Patent Application No. 678-2016", dated Jul. 11, 2017, 7 Pages.
"Office Action Issued in Chilean Patent Application No. 678-2016", dated Dec. 20, 2017, 7 Pages.
"Office Action Issued in Mexican Patent Application No. MX/A/2016/003720", dated Jun. 12, 2017, 4 Pages.
"Office Action Issued in Indonesian Patent Application No. P00201601919", dated Aug. 16, 2018, 11 Pages.
"First Office Action and Search Report Issued in Chinese Patent Application No. 201580043140.X", dated May 29, 2019, 26 pages.

* cited by examiner

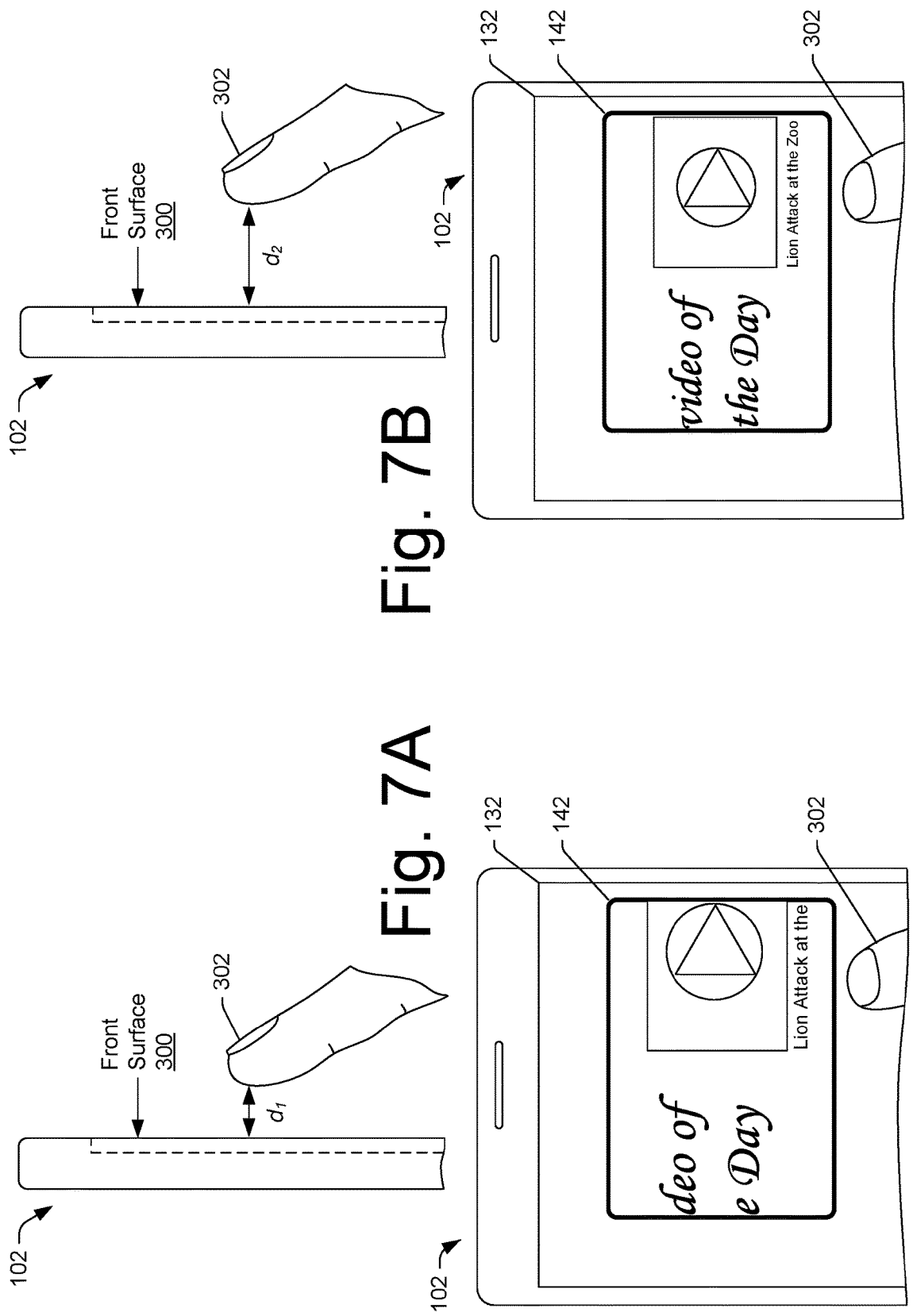

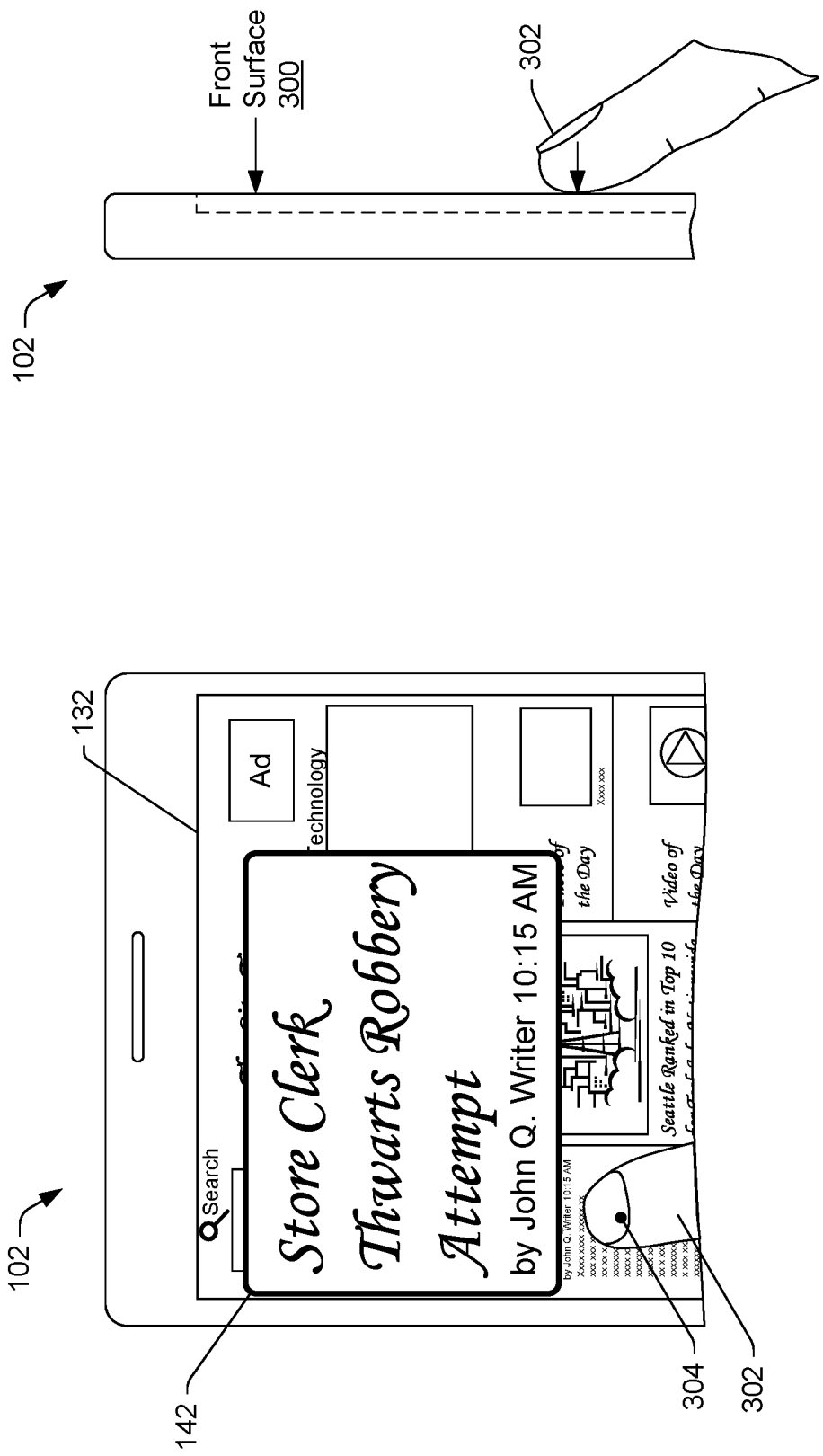

HOVER-BASED INTERACTION WITH RENDERED CONTENT

CROSS REFERENCE TO RELATED APPLICATION

This application claims priority to U.S. patent application Ser. No. 14/458,136, filed on Aug. 12, 2014, which is expressly incorporated herein by reference in its entirety.

BACKGROUND

Desktop computers once reigned as the most common personal computer configuration, leading software developers to create content designed for optimal rendering on a desktop display. For example, website developers often favor rich, dense content for a web page so that the display "real estate" on a viewing device can be utilized to its fullest extent. One factor driving website developers toward rich, dense web page content is the fact that third party entities are willing to pay for their content (e.g., advertisements) to be provided on a content provider's web page. This means that content providers effectively lose money when they choose to leave empty space on a web page.

Designing content that is rich and dense is generally a nonissue with desktop displays. For instance, an average user whose eyes are positioned roughly a foot away from a 19 inch desktop display is capable of unassisted reading of dense content rendered on the display, and is further able to navigate and browse the content by manipulating an on-screen cursor with a mouse or a similar pointing device.

As computing technology has advanced, however, computing devices having a small form factor have become ubiquitous. For example, many individuals own a smart phone (typically with a display size in the range of about 4 to 5 inches) and take it with them everywhere they go. Furthermore, consumers are now becoming familiar with the practice of surfing the Internet from the comfort of their own living room on a home television (TV) display. In either scenario, at least some content that is rendered on the user's display may be difficult to read and/or select when attempting to interact with the content. With respect to small form factor devices, readability and/or selectability issues stem from rendering dense content on a small display. A similar issue arises in the living room TV scenario when a user is situated at a substantial distance from the display that makes it difficult to read and/or select content provided in a rich, dense layout. As a consequence, users continue to experience frustration when navigating and browsing content on their consumer devices.

SUMMARY

Described herein are techniques and systems for enabling "hover-based" interaction with content that is rendered on a display of a viewing device. The term "hover," (sometimes called "three-dimensional (3D) touch") is used to describe a condition where an object is positioned in front of, but not in contact with, the front surface of the display, and is within a predetermined 3D space or volume in front of the display. Accordingly, a hovering object may be defined as an object positioned in front of the display of the computing device within the predetermined 3D space without actually contacting the front surface of the display. The dimensions of the 3D space where hover interactions are constrained, and particularly a dimension that is perpendicular to the front surface of the display, may depend on the size of the display and/or the context in which the display used, as will be described in more detail below.

In some embodiments, a process of enabling hover-based interaction with content includes rendering the content on a display, detecting an object in front of, but not in contact with, a front surface of the display, and in response to detecting the object, determining a location on the front surface of the display that is spaced a shortest distance from the object relative to distances from the object to other locations on the front surface. The determined location on the front surface of the display may then be used to determine a portion of the content that is rendered at the location or within a threshold distance from the location, and a magnified window of the portion of the content may then be displayed in a region of the display. In some embodiments, the portion of the content within the magnified window is actionable by responding to user input when the user input is provided within the magnified window. Systems and computer-readable media for implementing the aforementioned process are also disclosed herein.

By displaying a magnified window in a region of the display in response to detecting an object hovering in front of the display, a user may experience enhanced browsing and navigation of rendered content. Specifically, the rendered content may remain at a lowest zoom level (i.e., zoomed out), and the user may conveniently identify portions of the rendered content that are of interest to the user without changing the zoom level of the rendered content. In other words, the magnified window feature eliminates the steps required to pinch and zoom (and potentially pan) the content in order to find, read, and/or select content rendered on the display, saving the user time and eliminating frustration when browsing content. Upon finding an interesting portion of the content via the magnified window, the user may then have the ability to zoom to the portion of interest via a user input command. Moreover, the magnified window feature also enables content providers to continue to design content that is rich and dense without expending resources on "mobile" versions of their content (e.g., mobile sites) that tend to remove content from their site, which in turn leads to lost revenue.

In some embodiments, the actionable content that is rendered on a display of a viewing device is configured to respond to received hover interactions by modifying the rendered content and/or rendering additional content in response to the detected hover interactions. In this scenario, hover-based interaction with the rendered content may be enabled by a process that includes rendering content on a display, detecting an object in front of, but not in contact with, a front surface of the display, and in response to detecting the object, identifying a pointer event associated with a portion of the content underneath the object. A display-related function associated with the identified pointer event may be determined and performed to modify the rendered portion of the content and/or render additional content on the display. In some embodiments, the hover interaction from the object may be provided within the magnified window such that the portion of the content in the magnified window is modified and/or additional content is rendered within the magnified window as it would be outside of the magnified window.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

FIG. 7A illustrates a partial side elevation view and a partial front elevation view of the example computing device showing an object hovering at a first distance from the front surface of the display, as well as a first magnification level of the magnified window.

FIG. 7B illustrates the partial side and front elevation views of the example computing device showing the object hovering at a second distance from the front surface of the display, as well as a second magnification level of the magnified window.

FIG. 10A illustrates a partial front elevation view of the example computing device showing the object providing touch-based input at a location on the display.

FIG. 10B illustrates a partial side elevation view of the example computing device and object of FIG. 10A showing the object providing the touch-based input at the location.

DETAILED DESCRIPTION

Embodiments of the present disclosure are directed to, among other things, techniques and systems for enabling "hover-based" interaction with content that is rendered on a display of a viewing device. Although examples are provided herein predominantly with reference to a mobile computing device (e.g., a smart phone), it is to be appreciated that the techniques and systems are not limited to mobile devices. For instance, viewing devices that may benefit from the techniques disclosed herein may include, without limitation, mobile devices (e.g., smart phones, tablet computers, portable media players, wearable computers, etc.), as well as television (TV) displays, displays implemented within moving vehicles (e.g., navigation displays in automobiles, aircraft, etc.), and the like. In this sense, displays described herein over which hover interactions may be detected may be mobile (e.g., integrated into a mobile computing device, vehicle, etc.) or situated (e.g., wall mounted displays).

The characteristics of the hover-based input that may be provided to the variety of devices contemplated herein may vary with the size of the device, the context of the device's use, and/or the hardware (e.g., sensors) enabling such hover-based input. For example, a TV display in a living room may have a large screen size, may be stationary, and may utilize an image capture device (e.g., a depth camera) to detect hover interactions. By contrast, a small, mobile device, such as a smart phone, may utilize a sensor or sensor array embedded in the display itself (e.g., a capacitive-based touch screen sensor with proximity sensing capabilities). It is to be appreciated that, no matter the device type, sensors, or context of use, "hover," as used herein, may reference a physical state of an object that is positioned within a predetermined 3D space in front of the display without actually contacting the front surface of the display. The dimensions of the predetermined 3D space may be defined by a two-dimensional (2D) area on the display and a distance in a direction perpendicular to the front surface of the display. In this sense, objects that are positioned outside of the 2D area on the display, contacting the display, or beyond a threshold distance in a direction perpendicular to the front surface of the display may be considered to not be in a hover state.

The techniques and systems described herein may be implemented in a number of ways. Example implementations are provided below with reference to the following figures.

Example Computing System

Figure 1:
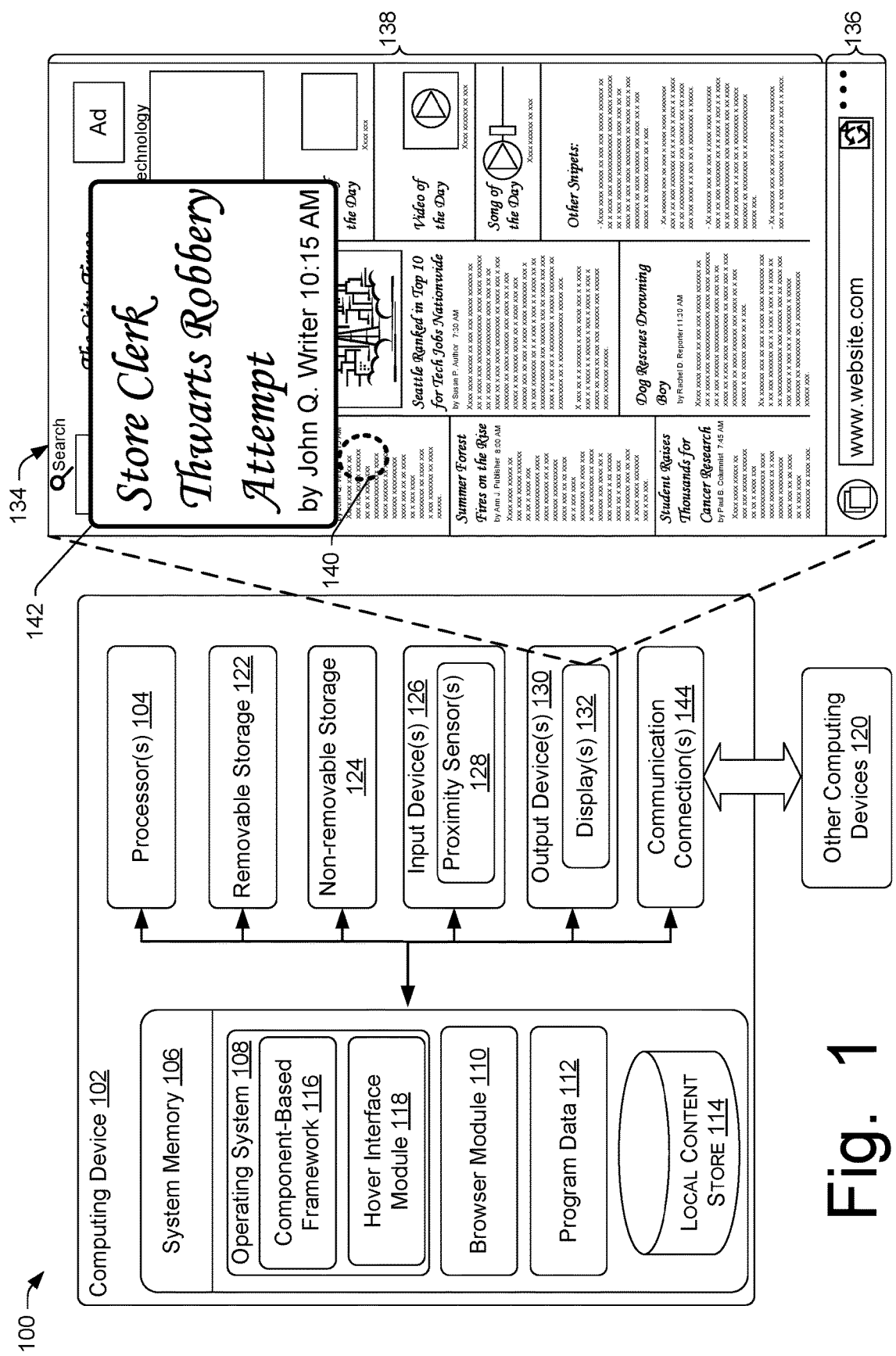
FIG. 1 illustrates an example computing system comprising a computing device configured to enable hover-based interaction with rendered content.

FIG. 1 illustrates an example computing system 100. The system 100 may include a computing device 102 configured to enable hover-based interaction with rendered content. The system 100 is merely one example system to implement the techniques described herein such that the techniques described herein are not limited to performance using the system of FIG. 1.

Figure 2:
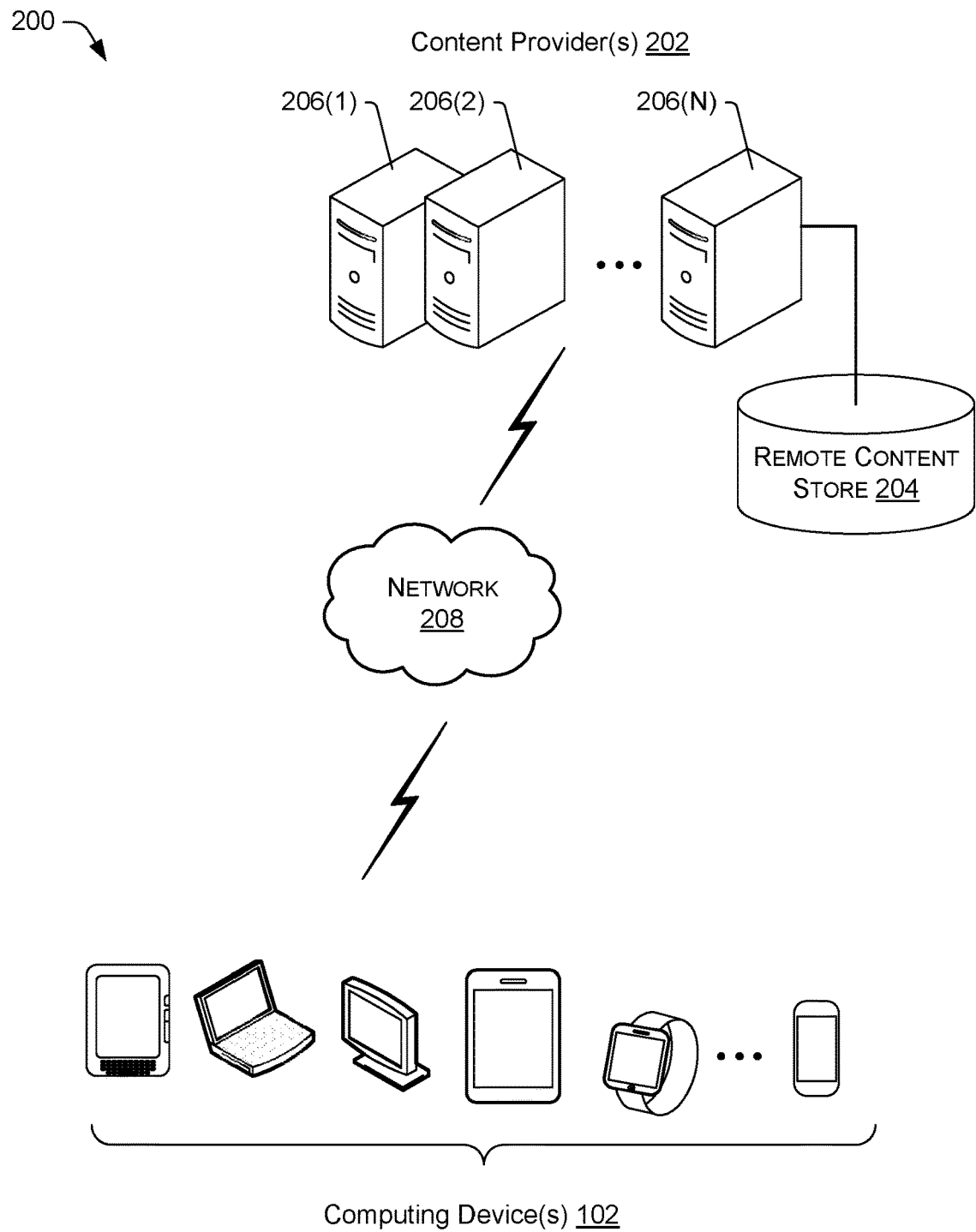
FIG. 2 illustrates an example computing system environment showing example computing device configured to receive content from a remotely located content provider(s).

The computing device 102 may be implemented as any number of computing devices (nonlimiting examples of which are shown in FIG. 2) including a mobile phone (smart phone), a tablet computer, an electronic book (e-book) reader, a laptop computer, a netbook computer, a television, a set-top box couple to a display, a game console coupled to a display, a navigation device (e.g., global positioning system (GPS) device), an vehicle-mounted display, a wearable computer (e.g., a smart watch), a medical imaging device, digital camera and/or video recorder, and so on.

The computing device 102 may be equipped with one or more processors 104 and system memory 106. Depending on the exact configuration and type of computing device, the system memory 106 may be volatile (e.g., random access memory (RAM)), non-volatile (e.g., read only memory (ROM), flash memory, etc.), or some combination of the two. The system memory 106 may include, without limitation, an operating system 108, a browser module 110, program data 112, and a local content store 114 accessible to the processor(s) 104.

The operating system 108 may include a component-based framework 116 that supports components (including properties and events), objects, inheritance, polymorphism, reflection, and provides an object-oriented component-based application programming interface (API), such as that of the Win32™ programming model and the .NET™ Framework commercially available from Microsoft® Corporation of Redmond, Wash. The API provided by the component-based framework 116 may comprise a set of routines, protocols, and/or tools associated with the operating system 108 and/or an application program of the operating system 108 that provides an interface with the operating system 108 and/or associated application programs.

The operating system 108 may further include a hover interface module 118 configured to enable hover-based interaction with a display of the computing device 102 and the content rendered thereon. In general, the operating system 108 may be configured with one or more stacks to drive a standard class of human interface devices (HIDs) (e.g., keyboards, mice, etc.) as well as enabling touch-screen input (i.e., contact-based input with an associated display). The hover interface module 118 additionally enables the computing device 102 to determine and interpret hover-based input received from objects (e.g., a user's finger or hand, a stylus, a pen, a wand, etc.) that hover in front of an associated display, and to perform display-related functions pertaining to the hover-based input. In order to determine and interpret hover-based input from an object, the hover interface module 118 may rely on one or more additional hardware and/or software components of the computing device 102, such as the browser module 110 and one or more hardware sensors of the computing device 102 that are configured to detect a hovering object (i.e., an object in front of, but not contacting, the display of the computing device 102).

The browser module 110 may be configured to receive content, and to render the received content via a browser (e.g., a web browser) on a display of the computing device 102. Execution of the browser module 110 may, for example, provide access to a website by rendering web pages served by the website on an associated display. The browser module 110 may be further configured to interact with the hover interface module 118 via the API of the operating system 108 for enabling hover-based interaction with content rendered via the browser. The content to be rendered may comprise documents, applications, web content, and the like, which may be received/accessed from the local content store 114 when the content is stored locally on the computing device 102, or from remote sources, such as from the other computing devices 120 shown in FIG. 1 (e.g., content provider servers).

In some embodiments, the content received by the browser module 110 may comprise web page content based on hyper text markup language (HTML) code that configures the content to be "actionable" in that the content is responsive to user input. Any suitable scripting language (e.g., JavaScript, Jscript, European Computer Manufacturers Association script (ECMAScript), etc.) or program (e.g., Java applet) may be utilized for enabling actionable content, including content that may be linked to hover functionality. In this sense, the content received by the browser module 110 may be coded with event-driven programming languages to register event handlers/listeners on element nodes inside a document object model (DOM) tree for any type of content. One suitable event model that may be utilized for making content actionable is the World Wide Web Consortium (W3C) model for pointer events, including hover events.

In an illustrative example, the content received by the browser module 110 may comprise web page content that includes selectable (i.e., actionable) text that responds to selection input by modifying the selected text with highlighting, text selection grippers, or other suitable display-based modification. As another example, the content on a web page may include links (e.g., hyperlinks) to other web pages or sites, video or audio playback buttons for embedded video/audio content, and so on. Accordingly, upon selection of such actionable content, the content may respond by navigating to another webpage or playing back video/audio files, respectively. When hover events are associated with portions of the content, those portions may be actionable by changing in appearance (i.e., display modification) or by rendering additional content (e.g., a drop down menu, pop-up bubble with information about the content) in response to a cursor being positioned over the content, and these display modifications and/or additional content may disappear from the display when the cursor is moved away from the hover-enabled content.

The computing device 102 may also include additional data storage devices (removable and/or non-removable) such as, for example, magnetic disks, optical disks, or tape. Such additional storage is illustrated in FIG. 1 by removable storage 122 and non-removable storage 124. Computer-readable media, as used herein, may include, at least, two types of computer-readable media, namely computer storage media and communication media. Computer storage media may include volatile and nonvolatile, removable and non-removable media implemented in any method or technology for storage of information, such as computer readable instructions, data structures, program modules, or other data. The system memory 106, removable storage 122 and non-removable storage 124 are all examples of computer storage media. Computer storage media includes, but is not limited to, RAM, ROM, electrically erasable programmable read-only memory (EEPROM), flash memory or other memory technology, compact disk read-only memory (CD-ROM), digital versatile disks (DVD), or other optical storage, magnetic cassettes, magnetic tape, magnetic disk storage or other magnetic storage devices, or any other non-transmission medium that can be used to store the desired information and which can be accessed by the computing device 102. Any such computer storage media may be part of the device 102.

In some embodiments, any or all of the system memory 106, removable storage 122 and non-removable storage 124 may store programming instructions, data structures, program modules and other data, which, when executed by the processor(s) 104, implement some or all of the processes described herein.

In contrast, communication media may embody computer-readable instructions, data structures, program modules, or other data in a modulated data signal, such as a carrier wave, or other transmission mechanism. As defined herein, computer storage media does not include communication media.

The computing device 102 may also include one or more input devices 126 such as a keyboard, pointing devices (e.g., mouse, touch pad, joystick, etc.), a pen, stylus, or wand, a touch screen (e.g., capacitive, resistive, infrared, surface acoustic wave (SAW), optical), a camera (e.g., 3D sensor), a proximity sensor, a microphone, etc., through which a user may enter commands and information into the computing device 102. Although the input device(s) 126 are shown in FIG. 1 to be within the computing device 102, it is to be appreciated that the input device(s) 126 may be physically embedded within the computing device 102 (e.g., a touch screen), or the input device(s) 126 may be peripheral devices that are removably coupled to the computing device 102 through either a wired or wireless connection (e.g., a peripheral camera-based input device). Accordingly, the input device(s) 126 may be coupled to the processor(s) 104 through a wired connection (e.g., a universal serial bus (USB) interface), or a wireless user input interface such as WiFi or Bluetooth®.

In some embodiments, the input device(s) 126 may include one or more proximity-based sensors 128 configured to detect an object hovering in front of a display of the computing device 102. The proximity-based sensor(s) 128 enable the computing device 102 to differentiate between contact-based touch events and non-contact (i.e., hover) interactions, rather than merely detecting objects near the display and resolving the detected object as a contact0based touch event. In this sense, the computing device 102 may be considered to be "hover-capable" because it may detect hover interactions and touch/contact interactions in a mutually exclusive manner.

The proximity sensor(s) 128 may include any suitable proximity sensing technology. One illustrative example of a suitable proximity sensing technology is a capacitive sensor or sensor array configured to detect an object hovering in front of the display of the computing device 102. Such a capacitive sensor or sensor array may include a two-dimensional (2D) grid of electrodes substantially spanning an area of the display screen of the computing device 102 with voltage applied to the electrodes so that the electrodes are configured to measure capacitance changes at each electrode. Capacitance changes at the electrodes may be influenced by an object (such as a human finger) in proximity to the electrodes such that a location on the front surface of the display that the object is closest to can be pinpointed based on electrodes that measure corresponding capacitance changes. In order to sense a hovering object, a capacitive sensor or sensor array may be based at least in part on self capacitance, which is known to provide stronger signal sensing as compared to mutual capacitance sensors so that an object may be detected in front of the front surface of the display without the object contacting the display. A proximity sensor 128 based on a combination of self capacitance and mutual capacitance may enjoy the benefits of both types of capacitive sensors, namely proximity sensing and multi-touch (i.e., detecting multiple touch locations at the same time), respectively. In some instances, the proximity sensor(s) 128 may be configured to detect an object in front of the display that is at a distance within the range of about 0.001 inches to about 8 inches from the front surface of the display in a direction perpendicular to the front surface.

One example of a relatively "long range" input device 126 configured to detect an object positioned in front of the display of the computing device 102 is a depth camera (e.g., the Kinect® sensor used with the Xbox® console system from Microsoft® Corporation of Redmond, Wash.). A depth camera may be configured to capture image data and depth information using any suitable technique such as time-of-flight (ToF), structured light imaging, stereo imaging, and the like. In some instances, the proximity sensor(s) 128 with longer range sensing capabilities may be configured to detect an object in front of the display that is at a distance within the range of about 20 inches to about 170 inches from the front surface of the display.

It is to be appreciated that the input device(s) 126 are not limited to the examples described above, and any suitable proximity sensor(s) 128 may be used to detect an object hovering in front of a display of the computing device 102, including, but not limited to, inductive, magnetic, ultrasonic, or other suitable proximity sensors 128.

The computing device 102 may also include output device(s) 130, such as a display 132 (e.g., a liquid crystal display (LCD), plasma, rear projection, etc.), one or more speakers, a printer, or any other suitable output device coupled communicatively to the processor(s) 104. The output device(s) 130 may generally be configured to provide output to a user of the computing device 102. In some embodiments, the output device(s) 130 may be integrated into the computing device 102 (e.g., an embedded display 132), or provided externally as a peripheral output device 130 (e.g., a peripheral display 132).

FIG. 1 illustrates an example screen rendering 134 that may be output via the display 132 of the computing device 102 when content is rendered on the display 132. In the example of FIG. 1, the screen rendering 134 represents a web browser displaying web page content. Accordingly, the screen rendering 134 may include a navigation bar 136 having an address field for entering a uniform resource locator (URL) of a website (here "www.website.com") and various other controls that may provide a user with browsing functionality to open additional browser windows, refresh the web page content, and so on. The screen rendering 134 may further include content 138 within a control area of the browser that is rendered on the display 132. Notably, the content 138 in the example of FIG. 1 is "rich and dense" due to the web page having been designed for optimal rendering on a desktop computer display.

FIG. 1 further illustrates an area 140 on a front surface of the display 132 where an object is detected to be hovering over the front surface of the display 132. As will be discussed in more detail below, the area 140 may be resolved to a point location on the front surface of the display 132 that is representative of the object's location relative to the screen when the object is hovering in front of the screen. The proximity sensor(s) 128 may detect the hovering object, and the hover interface module 118 may determine that the objects position in front of the display 132 represented by the area 140 is at a location within a control area where hover functionality is enabled. In some embodiments, the browser module 110 may interact with the operating system 108 via the API of the operating system 108 in order to specify the control area as bounding the content 138, but not the navigation bar 136. The browser module 110 may further specify a zoom level of the rendered content 138 (in this case the content 138 may be zoomed out to a lowest zoom level). With this information, the hover interface module 118 may determine that rendered content is at a lowest zoom level and that the object is hovering within the control area of the web browser so that a hover event may be detected with respect to the rendered content 138.

When a hover event is detected, the hover interface module 118 may cause performance of a display-related function that is reflected on the display 130 of the computing device 102. Display-related functions that may be performed in response to detection of a hover event include, without limitation, displaying a magnified window 142 of a portion of the content 138 (e.g., a portion of the content 138 underneath the object), modifying the display of the portion of the content 138, and/or rendering additional content in association with the portion of the content 138. The portion of the content 138 rendered within the magnified window 142 of FIG. 1 may represent a portion of the content 138 that is rendered at a location within the area 140 or within a threshold distance from such a location (e.g., just above the location of the object). It is to be appreciated that the hover interaction capability of the computing device 102 may be turned "on" or "off" via user settings or a similar user configuration of the device 102 in instances where hover interaction is not desired.

The computing device 102 may operate in a networked environment and, as such, the computing device 102 may further include communication connections 142 that allow the device to communicate with the other computing devices 120, such remotely located content providers. The communication connections 142 are usable to transmit and/or receive data, such as content that may be stored in the local content store 114.

FIG. 2 illustrates an example computing system environment 200 showing example computing devices 102 configured to receive content from a remotely located content provider(s) 202. Although embodiments are described in the context of a web based system, other types of client/server-based communications and associated application logic could be used. FIG. 2 illustrates that content to be rendered on the display 132 of the computing device 102 may be downloaded or otherwise received from the content provider(s) 202 that may store the content in a remote content store 204. In some examples, the received content may be web page content from a website of the content provider(s) 202. In this scenario, the content provider 202 may utilize one or more server(s) 206(1), 206(2), . . . , 206(N) (collectively 206), perhaps arranged in a cluster or as a server farm, to host one or more websites. A user associated with a computing device 102 may then access the website by submitting a request, such as in the form of a URL entered into an address field of a web browser executing on the computing device 102, to the server(s) 206 over a network 208. Upon receiving the request, the server(s) 206 may return a web page back to the requesting computing device 102 over the network 208. The website may be capable of handling requests from many users and serving, in response, various web pages that can be rendered on associated displays of the computing devices 102. The network 208 represents any one or combination of multiple different types of networks, such as wide area networks (WANs) or local area networks (LANs) and including cable networks, the Internet, and wireless networks.

Figures 3A, 3B:
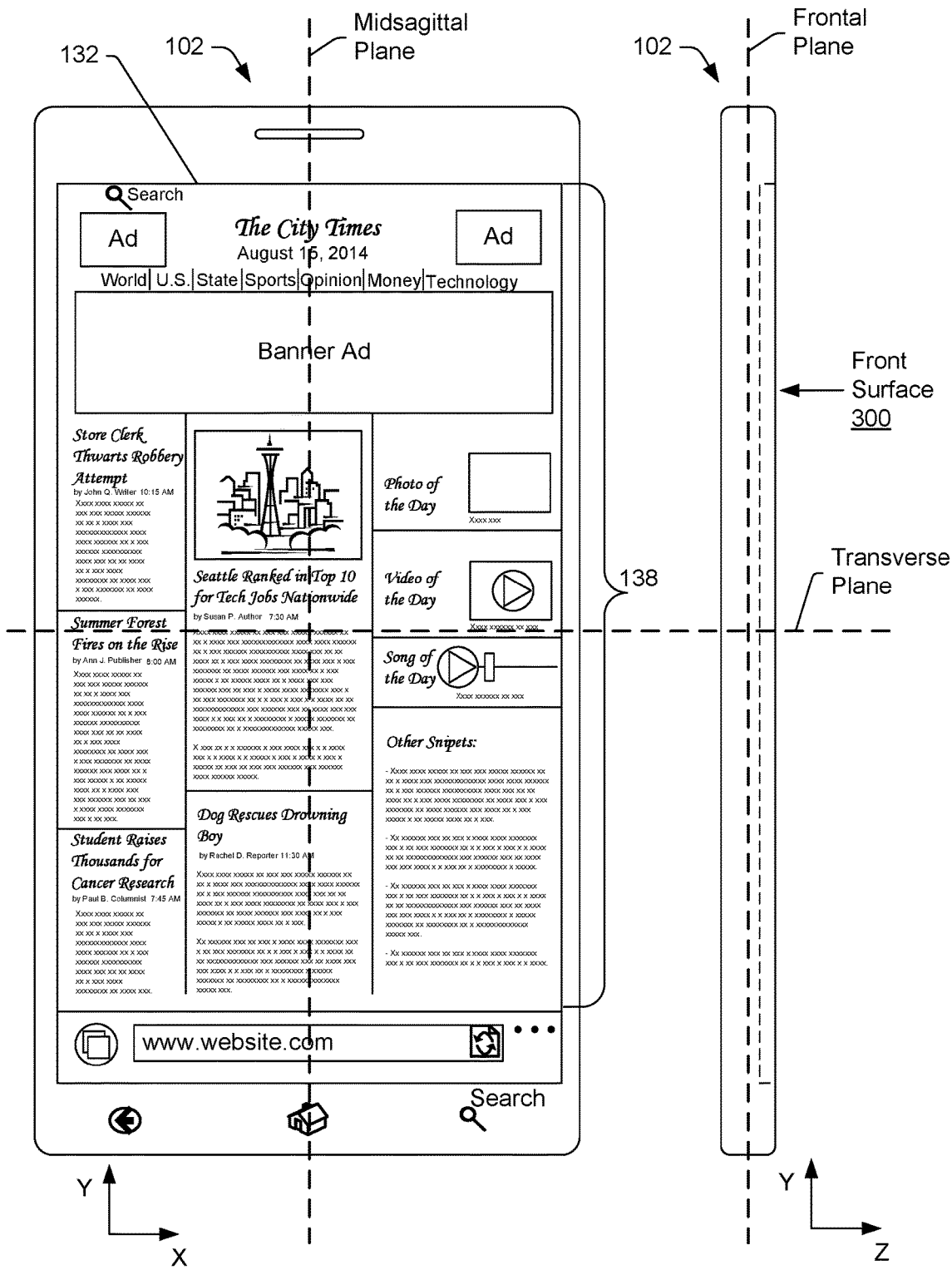
FIG. 3A illustrates a front elevation view of an example computing device having an example display rendering actionable content, the computing device being configured to enable hover-based interaction with the rendered content.
FIG. 3B illustrates a side elevation view of the example computing device of FIG. 3A.

FIG. 3A illustrates a front elevation view of an example computing device 102 having an example display 132 rendering actionable content thereon, such as the content 138 of FIG. 1. In some embodiments, the aforementioned control area within which hover interactions may be constrained coincides with the 2D area on the display where the content 138 is rendered. The computing device 102 shown in FIG. 3A represents a "hover-capable" device in the sense that it includes the components described in FIG. 1 that enable hover-based interaction with the rendered content 138. FIG. 3B illustrates a side elevation view of the computing device 102 of FIG. 3A.

FIGS. 3A and 3B also show various planes of reference. As such, FIG. 3A shows an imaginary midsagittal plane that may run through the middle of the computing device 102 and split the computing device 102 into right and left sides. A transverse plane, which is an imaginary plane that divides the computing device 102 into superior (top/upper) and inferior (bottom/lower) parts, is shown running horizontally across FIGS. 3A and 3B. Furthermore, a frontal plane is shown by FIG. 3B as an imaginary vertical plane that divides the computing device 102 into front and back parts. Accordingly, FIG. 3B illustrates a front surface 300 of the display 132 as being a surface parallel to the frontal plane on the front part of the computing device 102. FIG. 3A further illustrates that a 2D coordinate reference plane (e.g., an x-y plane) parallel to the frontal plane may be utilized to reference (x, y) point locations on the front surface 300 of the display 132. Locations on the front surface 300 of the display 132 may also be represented by pixels of the display 132, and areas defined by groups of pixels. FIG. 3B illustrates that a direction perpendicular to the front surface 300 of the display 132 may be represented by a z-direction in terms of Cartesian coordinates.

Figures 3C, 3D:
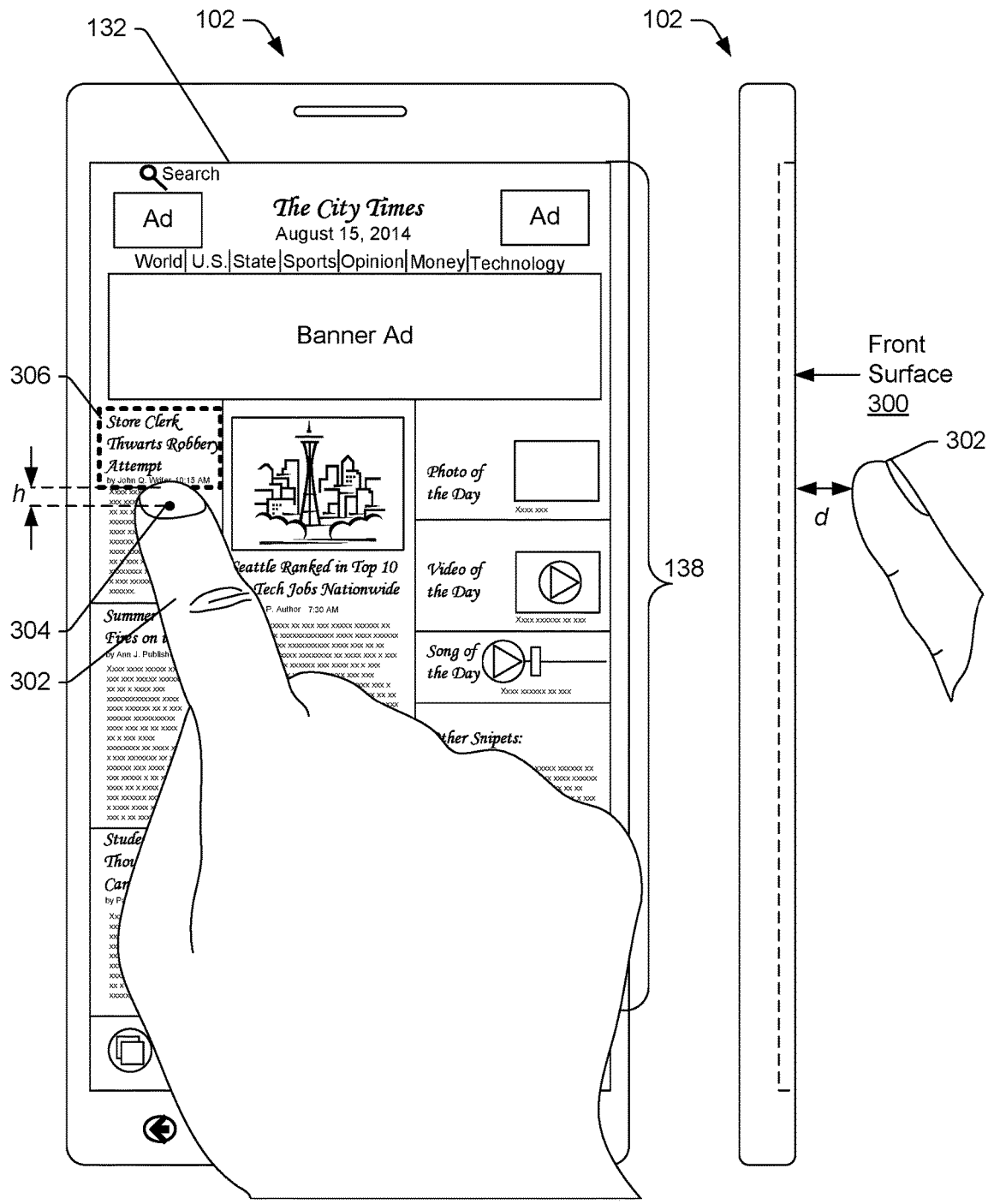
FIG. 3C illustrates the front elevation view of the example computing device of FIG. 3A when an object is hovering in front of the display of the computing device.
FIG. 3D illustrates the side elevation view of the example computing device of FIG. 3B when the object of FIG. 3C is hovering in front of the display of the computing device.

FIG. 3C illustrates the front elevation view of the example computing device 102 of FIGS. 3A and 3B when an object 302 (in this case, a user's finger) is hovering in front of the display 132 of the computing device 102. FIG. 3D illustrates a side elevation view of the computing device 102 and object 302 of FIG. 3C. Specifically, the object 302 is shown in FIG. 3D to be positioned (spaced) a distance, d, from the front surface 300 of the display 132 in the z-direction (a direction perpendicular to the front surface 300). It is to be appreciated that the distance, d, represents a shortest distance from the object 302 to the front surface 300 relative to other distances from the object 302 to other locations on the front surface 300. In one illustrative example, the computing device 102 may represent a smart phone that utilizes a proximity sensor(s) 128 (e.g., a capacitive sensor array) embedded within, or disposed behind, the display 132, and the distance, d, may be within the range of about 0.001 inches to about 1.5 inches. In some embodiments, the proximity sensor(s) 128 may be configured to detect the object 302 when it is positioned within a threshold distance from the front surface 300, such as a threshold distance that may be no greater than about 8 inches. For computing devices 102 with larger display sizes and/or computing devices 102 implemented in different contexts (e.g., living room TVs) with different types of proximity sensor(s) 128 (e.g., a depth camera), a threshold distance may be greater than 8 inches such that the distance, d, may be up to about 170 inches from the front surface 300 of the display 132, and the proximity sensor(s) 128 of the computing device 102 may still be able to detect the object 302 (e.g., the user's hand) hovering in front of the front surface 300 at that distance, d. It is also to be appreciated that the proximity sensor(s) 128 may be configured to detect multiple hovering objects 302, even though a single object 302 is shown in FIGS. 3C and 3D.

FIG. 3C further shows a point location 304 on the front surface 300 that is representative of the object's location relative to the display 132 when the object 302 is hovering in front of the display 132. The location 304 may be determined by the hover interface module 118 after receiving the indication of the detected object 302 from the proximity sensor(s) 128. In order to determine the location 304, the hover interface module 118 may access data regarding the x-y coordinates or pixels of the display 132 generally known to the operating system 108 and/or data from the proximity sensor(s) 128. As illustrated by FIG. 3D, the location 304 may represent a location 304 on the front surface 300 of the display 132 that is a shortest distance, d, from the object 302 to the front surface 300 because the object 302 is substantially in a direction from the location 304 that is perpendicular to the front surface 300 of the display 132.

FIG. 3C further shows that the hover interface module 118 may be further configured to determine a portion 306 of the content 138 that is rendered within a threshold distance, h, from the location 304. In the example of FIG. 3C, the portion 306 of the content 138 that is selected is rendered at a distance, h, above (i.e., toward the top part of the computing device 102) the location 304. In other embodiments, the portion 306 determined by the hover interface module 118 may be the portion of the content 138 that is rendered at the location 304 (i.e., content that is directly below the hovering object 302). It may be advantageous to select the portion 306 that is rendered at a distance, h, above the location 304 so that the object 302 does not obstruct a user's view of the portion 306, but it is to be appreciated that a portion directly below the object 302 or within a distance of the location 304 in a different direction may be selected without changing the basic characteristics of the system.

Figure 3E:
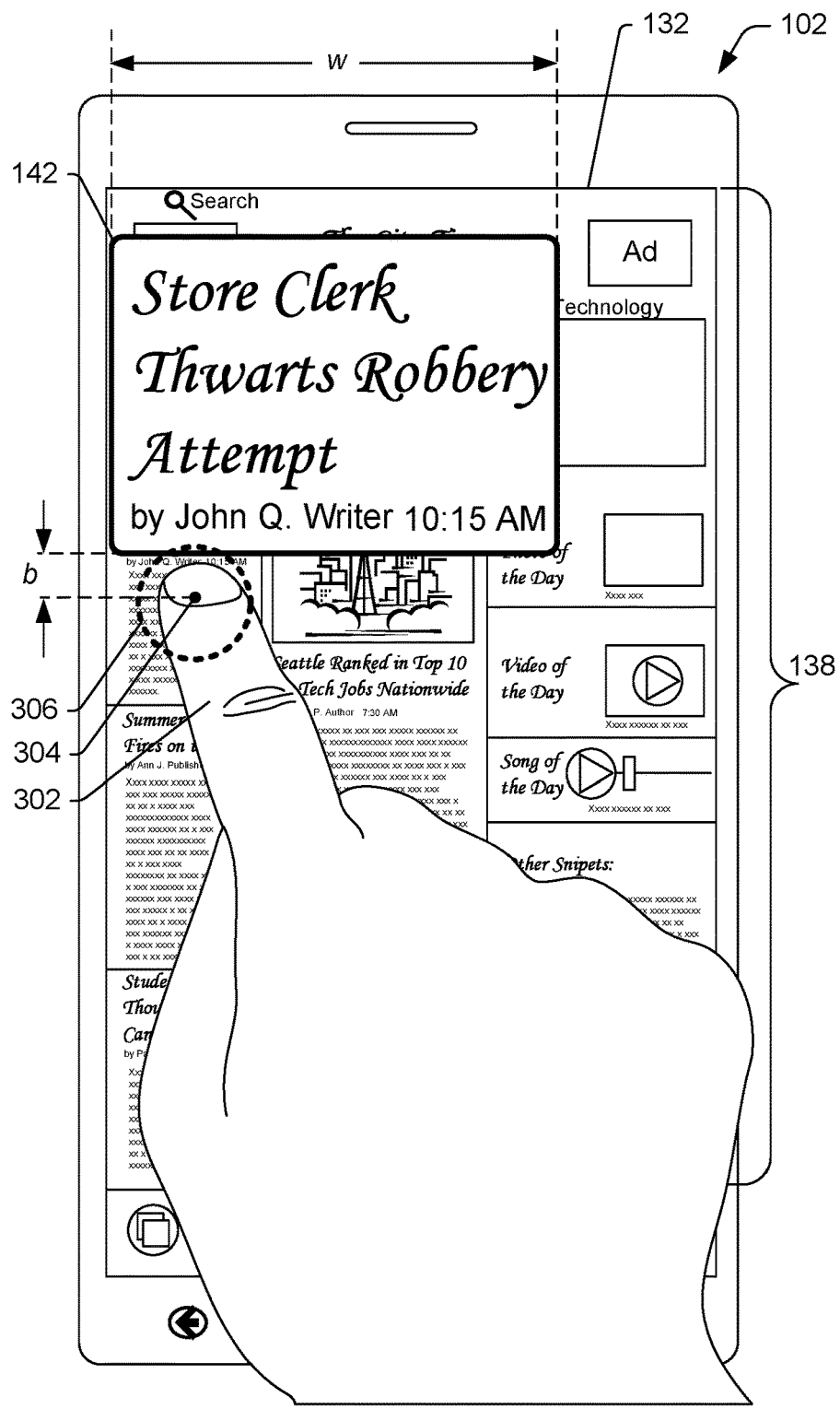
FIG. 3E illustrates the front elevation view of the example computing device when displaying a magnified window in a region of the display in response to a detected hover interaction from the object.

FIG. 3E illustrates the front elevation view of the example computing device 102 of FIGS. 3A-3D where a magnified window, such as the magnified window 142 of FIG. 1, is displayed in a region of the display 132 in response to a detected hover interaction from the object 302. The object 302 (finger) shown in FIG. 3E is in the same position shown by FIGS. 3C and 3D (i.e., a hover position). The magnified window 142 may contain the portion 306 of the content 138 shown in FIG. 3C. As will be described in more detail with reference to FIG. 4, the content that is rendered within the magnified window 142 may be actionable by responding to user input received within the magnified window 142 in the same or similar way to how the content is configured to respond to user input outside of the magnified window 142. For example, the text reading "Store Clerk Thwarts Robbery Attempt" is included in the portion 306 of the content 138, as shown in FIG. 3C, and it may be coded as hypertext that, upon selection outside of the magnified window 142 (e.g., a finger touching the display 132 on the text element), navigates a user, via a web browser to another page that contains the entire article associated with that text. In the same, or at least a similar, fashion, a user may provide input within the magnified window 142 to, for example, select the text reading "Store Clerk Thwarts Robbery Attempt." Upon receipt of the user input within the magnified window 142, the browser module 110 may navigate the user to the different web page with the entire article associated with that text. In this manner, the magnified window 142 acts as a "mini-browser" window that provides actionable content within the magnified window 142 itself by responding to user input provided within the magnified window 142.

In some embodiments, the magnified window 142 is of a width, w, that may be less than an overall width of the display 132. In one example, the width, w, is no greater than about 75% of the width of the display 132. In another example, the width, w, is no greater than about 50% of the width of the display 132. In yet another example, the width, w, is no greater than about 25% of the width of the display 132. A restriction on the width, w, to being a fraction of the width of the display 132 may allow for optimal magnification of the portion 306 of the content 138 that is rendered within the magnified window 142, and it may facilitate selectively browsing the content in a left-to-right manner, or vice versa.

In some embodiments, the region in which the magnified window 142 is displayed may include a bottom boundary that is located a predetermined distance, b, from the location 304 on the front surface 300 corresponding to the object 302. For example, the predetermined distance, b, may be within the range of about 0.2 inches to about 0.5 inches. In another example, the predetermined distance, b, may be no greater than about 1 inch. Rendering the magnified window 142 at a predetermined distance, b, above the location 304 may prevent the object 302 from obstructing the user's view of the content within the magnified window 142 or a portion thereof.

In some embodiments, the hover interface module 118 may identify an input gesture from the object 302 before causing the display of the magnified window 142. In this sense, the magnified window 142 may be displayed in response to receipt of the input gesture, which may take any suitable form. One example input gesture that may trigger the display of the magnification window 142 is in the form of the object 302 remaining in a first position shown in FIGS. 3C-3E for a predetermine period of time. "Remaining in the first position" may comprise hovering in front of the front surface 300 within a predetermined area 306 for the predetermined period of time. The predetermined area 306 may be circumscribed around the location 304 so that if the object 302 wavers slightly, it may be considered to have "remained in the first position." The predetermined period of time that the object 302 is to remain in the first position may be within a range of about 50 milliseconds to about 100 milliseconds. In other embodiments, the predetermined period of time may be no greater than about 2000 milliseconds. In this scenario, a user may provide an input gesture by holding a finger in a hover position within the predetermined area 306 for a predetermined period of time, and in response, the hover interface module 118 may cause display of the magnified window 142 to provide enhanced browsing of the content 138.

Although the magnified window 142 shown in FIGS. 1 and 3E is of a rectangular shape, it is to be appreciated that the magnified window 142 may comprise any suitable shape, such as circular, triangular, square, hexagonal, or any type of polygonal shape suitable for containing a magnified view of a portion 306 of the content 138.

Figure 4:
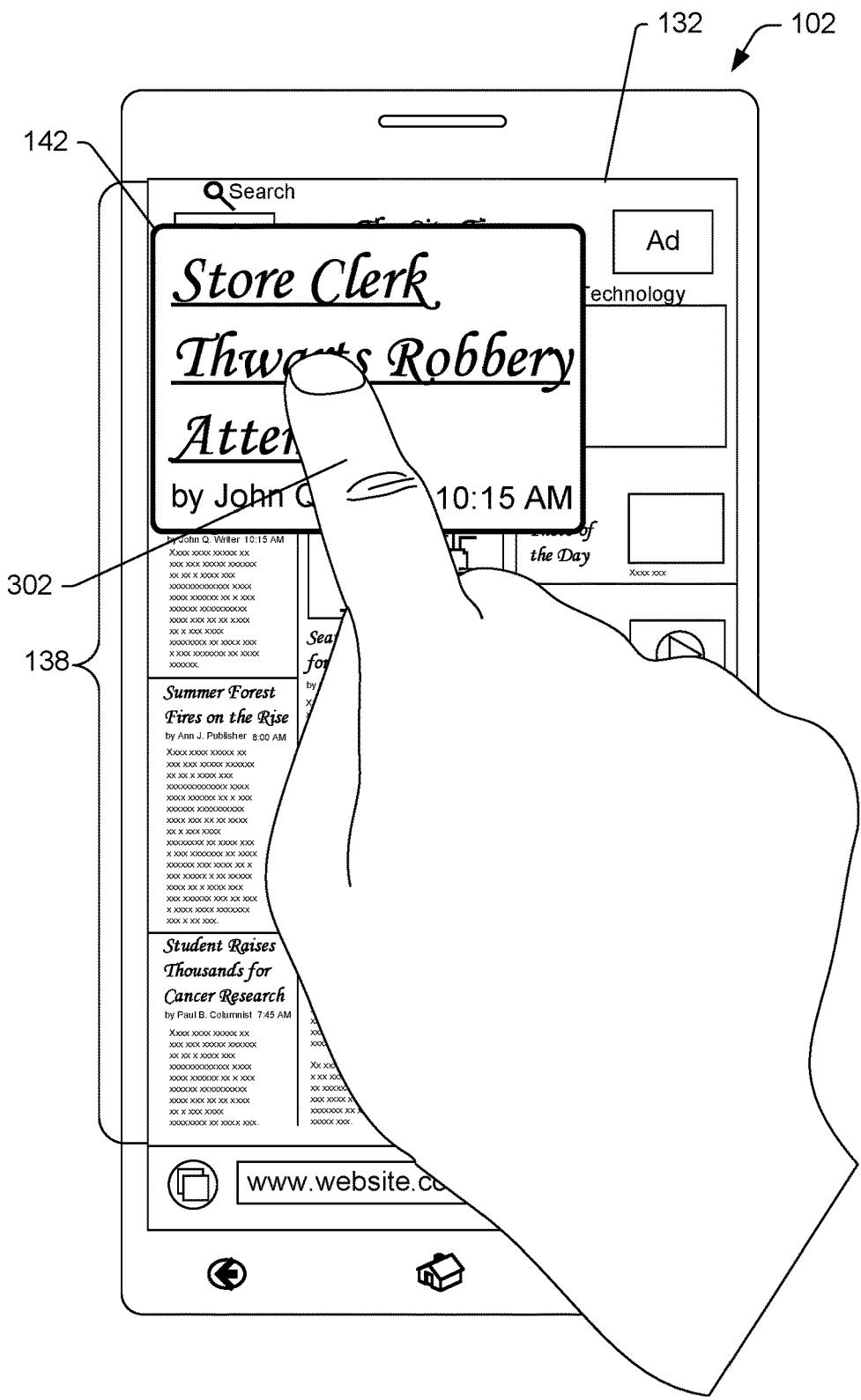
FIG. 4 illustrates a front elevation view of the example computing device of FIGS. 3A-3E showing user input provided by the object within the magnified window.

FIG. 4 illustrates a front elevation view of the example computing device 102 of FIGS. 3A-3E showing user input provided by the object 302 within the magnified window 142. The user input provided within the magnified window 142 to interact with the content therein may take any suitable form, such as the object 302 contacting the front surface 300 of the display 132 to provide touch-based input for selecting an element rendered within the magnified window 142. In the example of FIG. 4, a user has touched his finger to the front surface 300 of the display 132 on the text within the magnified window 142 that reads "Store Clerk Thwarts Robbery Attempt." Just as the user is able to provide touch-based input to the display 132 for selecting interactive content elements (e.g., hyperlinks), the user may contact the front surface 300 of the display 132 on the hypertext "Store Clerk Thwarts Robbery Attempt" that is provided within the magnified window 142 to select the text and command the browser module 110 to navigate to another web page with the full article associated with the text. In this sense, portion of the content within the magnified window 142 is actionable by responding to user input when the user input is provided within the magnified window 142, just as the portion 306 responds to user input outside of the magnified window 142.

In some embodiments, the user input provided within the magnified window 142, as illustrated in FIG. 4, may comprise a hover interaction from the object 302. For example, the object 302 may hover over the content rendered within the magnified window 142 at a distance from the front surface 300 of the display 132, and the actionable content, if coded to respond to hover events, may respond to the hover-based user input by performing a display-related function, such as changing the appearance of the content (e.g., underlining the text "Store Clerk Thwarts Robbery"), displaying additional content (e.g., a pop-up with information about the content, a drop down menu, etc.), and so on.

Figures 5A, 5B:
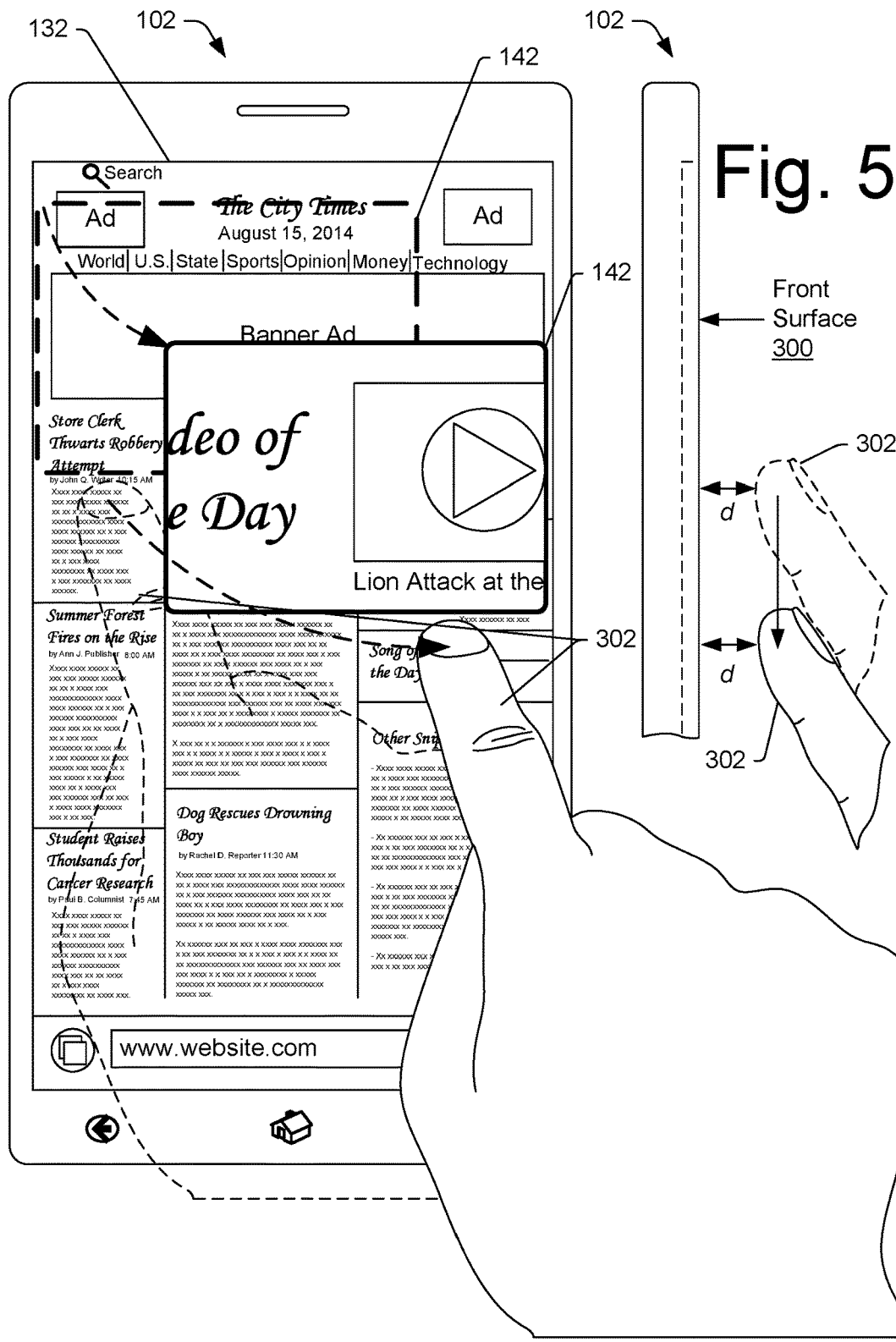
FIG. 5A illustrates a front elevation view of the example computing device of FIGS. 3-4 showing the object moving across a front surface of the display and the magnified window moving with the object.
FIG. 5B illustrates a partial side elevation view of the example computing device and moving object of FIG. 5A.

FIG. 5A illustrates a front elevation view of the example computing device 102 of FIGS. 3-4 showing the object 302 moving across the front surface 300 of the display 132 while maintaining a spaced relationship with the front surface 300. Accordingly, FIG. 5B illustrates a partial side elevation view of the computing device 102 and moving object 302 to illustrate the spaced relationship that is maintained during the movement of the object 302 across the front surface 300. In response to the movement of the object 302 shown in FIGS. 5A and 5B, the magnified window 142 is shown as having moved across the display 132 along with the moving object 302 from a first region (represented by the dashed box) of the display 132 to a second region of the display 132. In some embodiments, the hover interface module 118 may determine whether the object 302 moves across the front surface 300 below a predetermined speed. As will be described in more detail below, in some embodiments, if the object 302 moves too fast (i.e., above a threshold speed) across the front surface 300, the magnified window 142 may disappear from the display 132. Therefore, according to some embodiments, so long as the object 302 moves below a predetermined speed when traversing the front surface 300 in a spaced relationship thereto, the magnified window 142 may move along with the object 302 to a new region of the display 132 corresponding to a new position of the object 302. In the example of FIG. 5A, the magnified window 142 in the new/second region after the object 302 has moved contains another portion of the content 138 that is rendered at, or within a threshold distance from, a new location on the front surface 300 of the display 132 corresponding to the updated position of the object 302. In this manner, the object 302 may traverse the front surface 300 in a controlled manner (i.e., below a predetermined speed) to dynamically render different portions of the content 138 as the object 302 moves. This gives a user of the computing device 102 a virtual experience similar to moving a magnifying glass over a newspaper.

Figure 6:
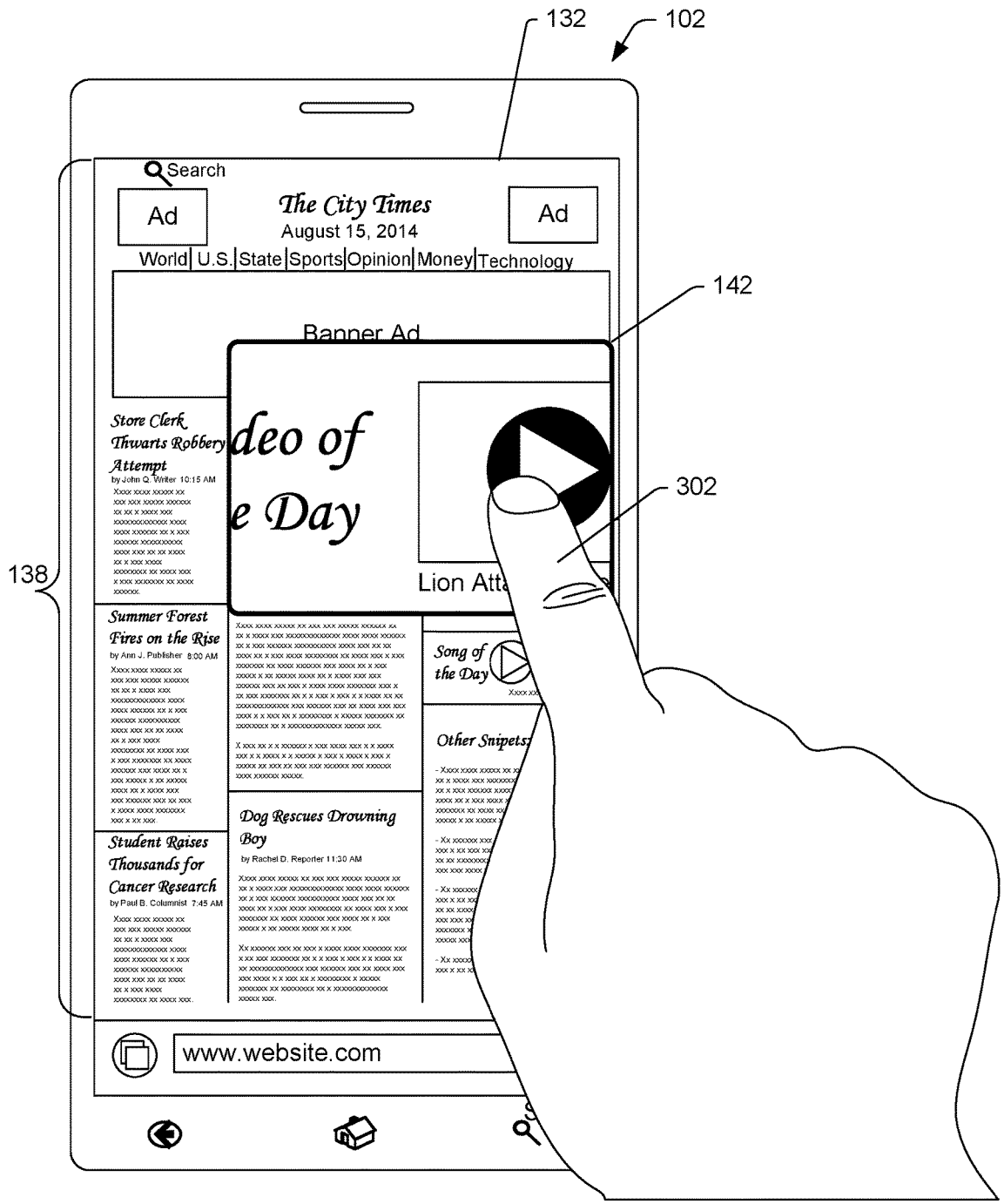
FIG. 6 illustrates a front elevation view of the example computing device showing user input provided by the object within the magnified window.

FIG. 6 illustrates a front elevation view of the computing device 102 of FIGS. 3-5 showing user input provided by the object 302 within the magnified window 142. The user input provided within the magnified window 142 may be provided in order to interact with the content therein, and it may take any suitable form, as described above with reference to FIG. 4. In the example of FIG. 6, the object 302 may contact the front surface 300 of the display 132 to provide touch-based input for selecting an element rendered within the magnified window 142. Specifically, the object 302 (finger) may touch the front surface 300 of the display 132 on the magnified video playback button rendered within the magnified window 142. It is recognized that when the magnified window 142 is not rendered on the display 132, the object 302 may touch the front surface 300 of the display 132 on the video playback button to cause a video to be played back to the user on the display 132. The magnified window 142 also renders actionable content that responds the same way as the actionable content 138 that is rendered on the display 132 outside of the magnified window 142. In this sense, the object 302 may provide input commands (e.g., contact the front surface 300 of the display 132) within the magnified window 142 to select interactive elements (e.g., the video playback button), and in response, the browser module 110 may respond to the user input, such as by initiating playback of the video file associated with the playback button.

In some embodiments, the user input provided within the magnified window 142 may comprise a hover interaction from the object 302. For example, the object 302 may hover over the content rendered within the magnified window 142 at a distance from the front surface 300 of the display 132, and the actionable content, if coded to respond to hover events, may respond to the hover-based user input by performing a display-related function, such as changing the appearance of the content (e.g., highlighting the circle of the video playback button), displaying additional content, and so on.

FIG. 7A illustrates a partial side elevation view and a partial front elevation view of the computing device 102 showing an object 302 hovering at a first distance, d1, from the front surface 300 of the display 132, as well as a first magnification level of the magnified window 142. FIG. 7B illustrates the partial side and front elevation views of the computing device 102 showing the object 302 hovering at a second distance, d2, from the front surface 300 of the display 132, as well as a second magnification level of the magnified window 142. Accordingly, FIGS. 7A and 7B illustrate that a magnification/zoom level of the content within the magnified window 142 may be adjusted or controlled in response to movement of the object 302 in the z-direction (i.e., the direction perpendicular to the front surface 300), allowing a user to control the rendered size of the content within the magnified window 142 when the magnified window 142 is displayed. The hover interface module 118 may enable such z-direction zoom control by accessing mapping data in the program data 112 that maps magnification levels to z-direction distances from the front surface 300 of the display 132. In this manner, an object 302 detected at a first distance, d1, from the front surface 300 may be translated to a first magnification level for the content within the magnified window 142 so that the content within the magnified window 142 may be rendered at the first magnification level, and in response to determining that the object 302 has moved farther away from the front surface 300 in the z-direction to a second distance, d2, the magnification level of the content within the magnified window 142 may be adjusted (e.g., decreased). Detecting the object's distance from the front surface 300 may be performed by the proximity sensor(s) 128 based on received signal strength, time-of-flight (ToF), or other means for determining distance of the object 302 from the front surface 300 of the display 132.

Figures 8A, 8B:
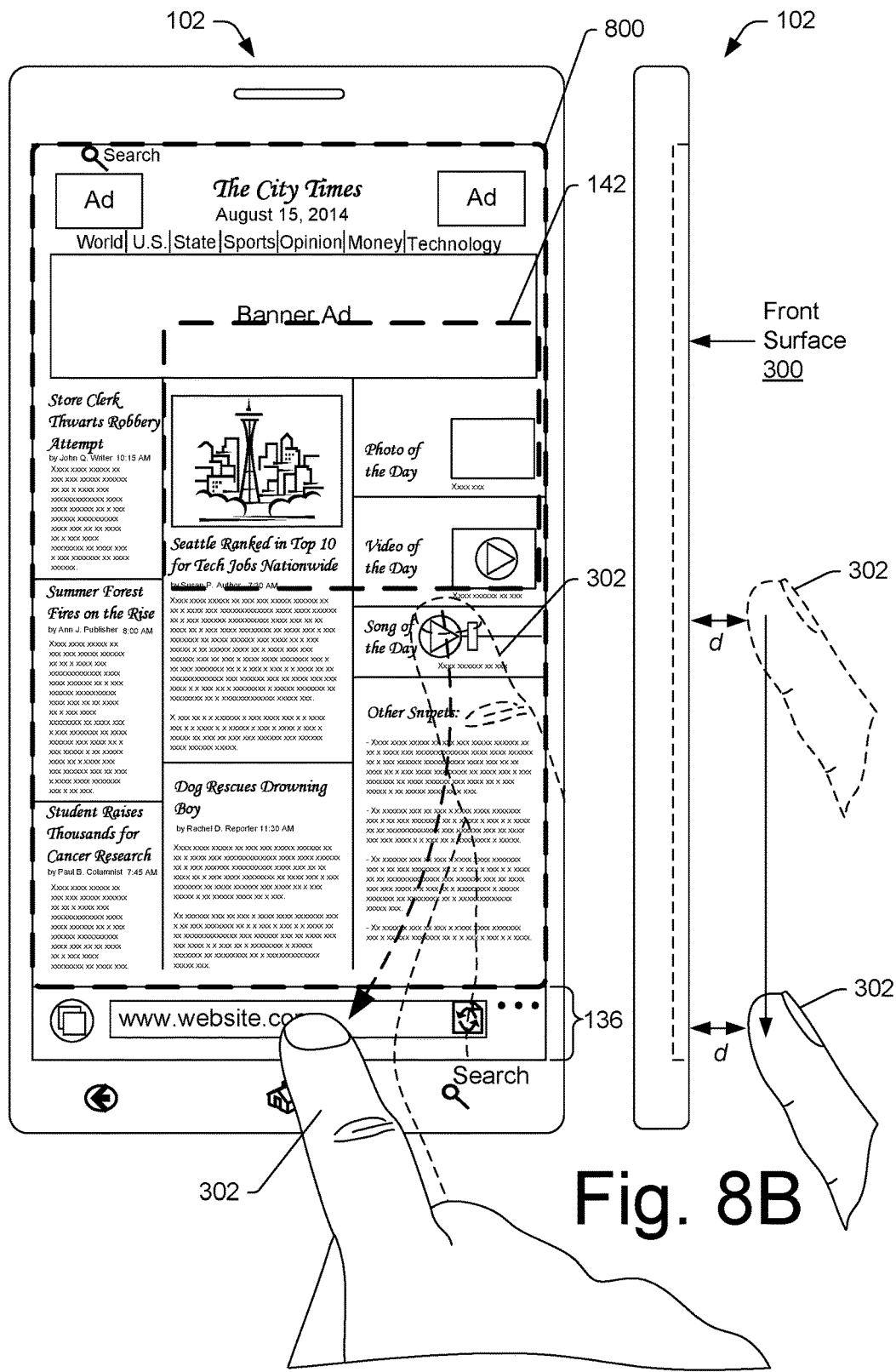
FIG. 8A illustrates a front elevation view of the example computing device showing the object moving from inside of a control area of a browser to a position outside of a boundary of the control area, causing the magnified window to disappear from the display.
FIG. 8B illustrates a side elevation view of the example computing device and moving object of FIG. 8A.

FIG. 8A illustrates a front elevation view of the computing device 102 showing the object 302 moving from inside of a control area 800 of a browser to a position outside of a boundary of the control area 800, causing the magnified window 142 to disappear from the display 132. FIG. 8B illustrates a side elevation view of the computing device 102 and object 302 to show that the movement of the object 302 across the front surface 300 of the display 132 occurs while the object 302 maintains a spaced relationship to the front surface 300 (i.e., the object 302 moves across the front surface 300 in a hovering state). FIGS. 8A and 8B demonstrate an example of one criterion for causing the magnified window 142 to disappear from the display 132 once it has been initially rendered; namely that the object 302 moves outside of the control area 800 designated on the display 132. For example, the browser module 110 may specify the control area 800 as comprising an area on the display 132 that encloses the content 138 rendered via a web browser. Accordingly, the navigation bar 136, although part of the screen rendering 134, may be designated as being outside of the control area 800, such that the magnified window 142 disappears in response to the object 302 moving to a position over the navigation bar 136 of the web browser. Any type of menu bar or control pane of an application program (e.g., a word processing program) may be designated in a similar manner to be outside of the control area 800 so that the magnified window 142 is rendered when the object 302 is hovering over the content 138, but not when it is hovering over other portions of the display 132 that do not render the actual content 138. It is to be appreciated that at least a portion of the boundary of the display 132 may be coincident with the control area 800 such that when the object 302 moves to a position outside of the boundary of the display 132 itself, the magnified window 142 may disappear in that instance as well.

In some embodiments, other criteria may be utilized to selectively render the magnified window 142 on the display 132. One example criterion may be that the object 302 moves across the front surface 300 of the display 132 above a predetermined speed (i.e., the object moves too fast). This criterion was alluded to while describing the movement of the object 302 below a predetermined speed with reference to FIGS. 5A and 5B. That is, when the object 302 moves in a hovering state across the front surface 300 of the display 132 below a predetermined speed, the magnified window 142 may move together with the object 132 to a new region of the display, but when the object exceeds the predetermined speed, the magnified window 142 may disappear from the display 132. Another example criterion for disappearing the magnified window 142 may be that the object 302 contacts the front surface 300 of the display 132 outside of the region where the magnified window 142 is displayed. Yet another example criterion for disappearing the magnified window 142 may be that the object 302 has moved away from the front surface 300 in the z-direction beyond a threshold distance from the front surface 300 in the z-direction. In any case, there may be instances where the magnified window 142 is displayed and when it is not, and the above described criteria may be utilized to determine those instances in which to disappear the object 302 from the display.

Figure 9:
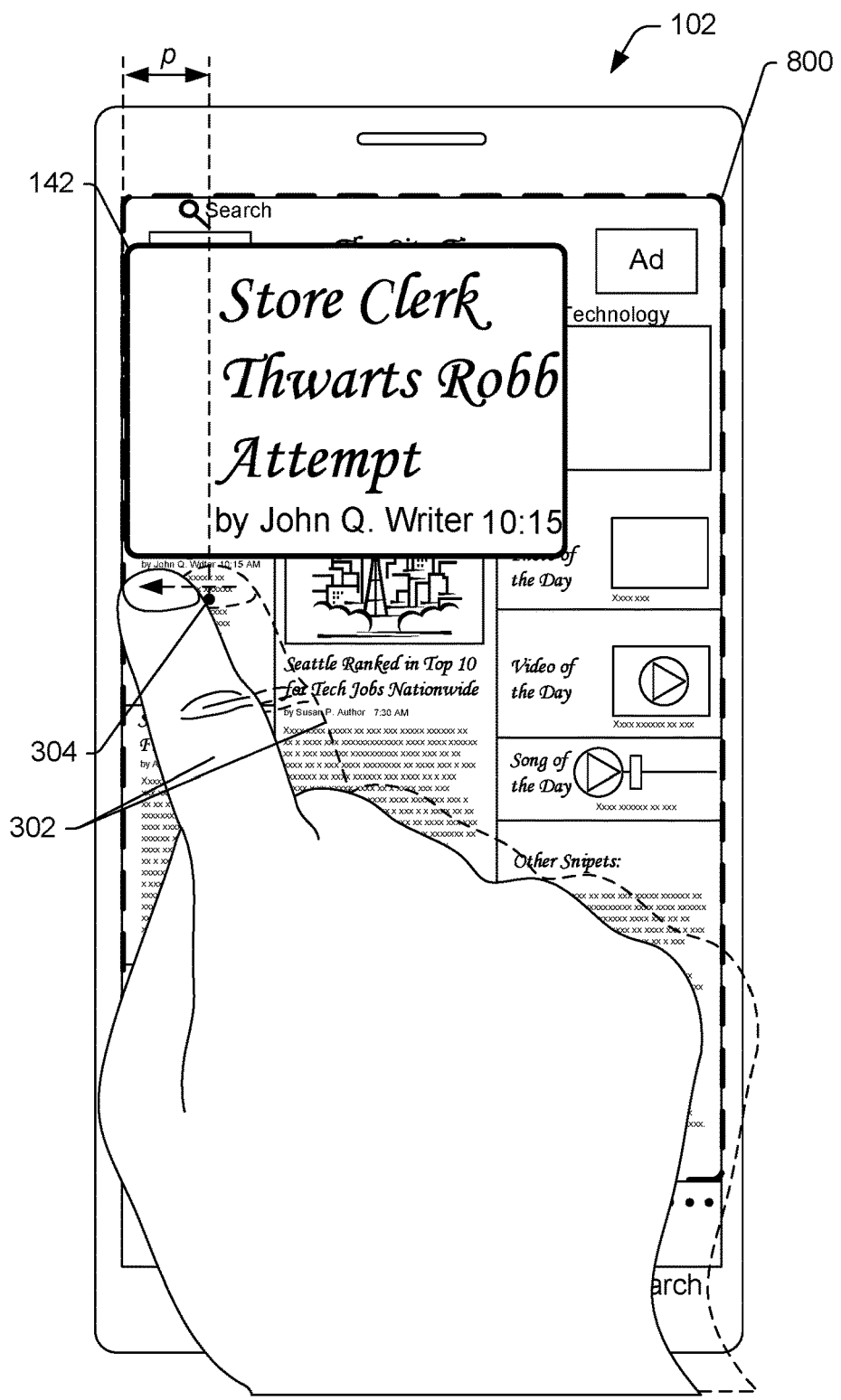
FIG. 9 illustrates a front elevation view of the example computing device showing the object moving from a position near the boundary of a control area on the display to a position closer to the boundary, causing the content within the magnified window to pan while the magnified window remains stationary within a region on the display.

FIG. 9 illustrates a front elevation view of the computing device 102 showing the object 302 moving from a position near the boundary of the control area 800 on the display 132 to a position closer to the boundary. Specifically, the hover interface module 118 may determine the location 304 where the object 302 is hovering over the front surface 300, and may further determine that the location 304 is a distance, p, from the boundary of the control area 800, where the distance, p, is within a threshold distance from the boundary of the control area 800. Upon determining that the object moves closer to the boundary of the control area 800 from the location 304, as shown in FIG. 9, the hover interface module 118 may pan the content within the magnified window 142 in an opposite direction to the direction of movement of the object 302. The panning of content within the magnified window 142 in these circumstances may occur in lieu of moving the magnified window 142 itself to a new region of the display 132. This may be advantageous because, when the object 302 is at the location 304, the side boundary of the magnified window 142 may substantially abut the boundary of the control area 800, which in some instances may be coincident with the boundary of the display 132. In this scenario, instead of moving the magnified window 142 outside of the boundary of the control area 800, the content within the magnified window 142 may be panned to reveal a portion of the content 138 at a border of the content 138 that was not otherwise visible within the magnified window when the object 302 was hovering over the location 304. In this manner, a user may view portions of the content 138 near an outer boundary of the content 138.

FIG. 10A illustrates a partial front elevation view of the computing device 102 showing the object 302 providing touch-based input at the location 304 on the display 132 where the object 302 may have previously been hovering to cause the display of the magnified window 142. The touch-based input provided at the location 304 may be any suitable type of contact-based input where the object 302 comes into contact with the front surface 300 of the display 132 at the location 304. To distinguish from contact indicative of a user's intent to make the magnified window 142 disappear, the hover interface module 118 may determine whether the touch-based input is provided as a multiple contact type of touch-based input (e.g., a "double-tap"). In this manner, two successive contacts within a predetermined period of time may indicate to the hover interface module 118 that a user desires to zoom to a portion of the content associated with the location 304.

Figure 10C:
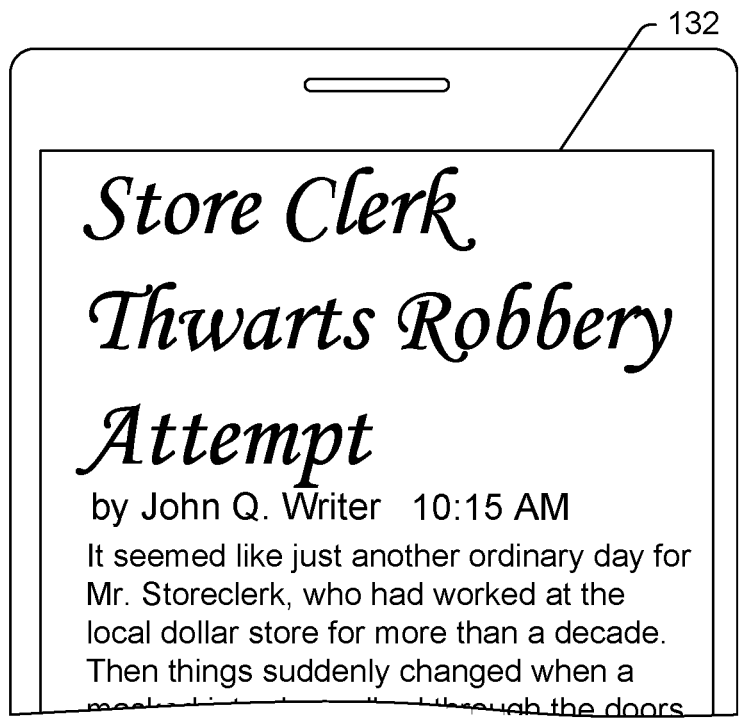
FIG. 10C illustrates a partial front elevation view of the example computing device of FIGS. 10A and 10B after receipt of the touch-based input showing a zoomed in portion of the content corresponding to the location where the touch-based input was received.

FIG. 10C illustrates a partial front elevation view of the computing device 102 of FIGS. 10A and 10B after receipt of the touch-based input at the location 304 on the front surface 300 of the display 132. Notably, the display 132 shows a zoomed-in view of the content rendered around the location 304; in this case, the article that the object 302 was hovering over. In this manner, a user may browse the content using the magnified window 142 as an aid in reading the content without actually zooming in on the content, and then user may zoom in on a portion of the content 138 that is of interest to him.

Figure 11:
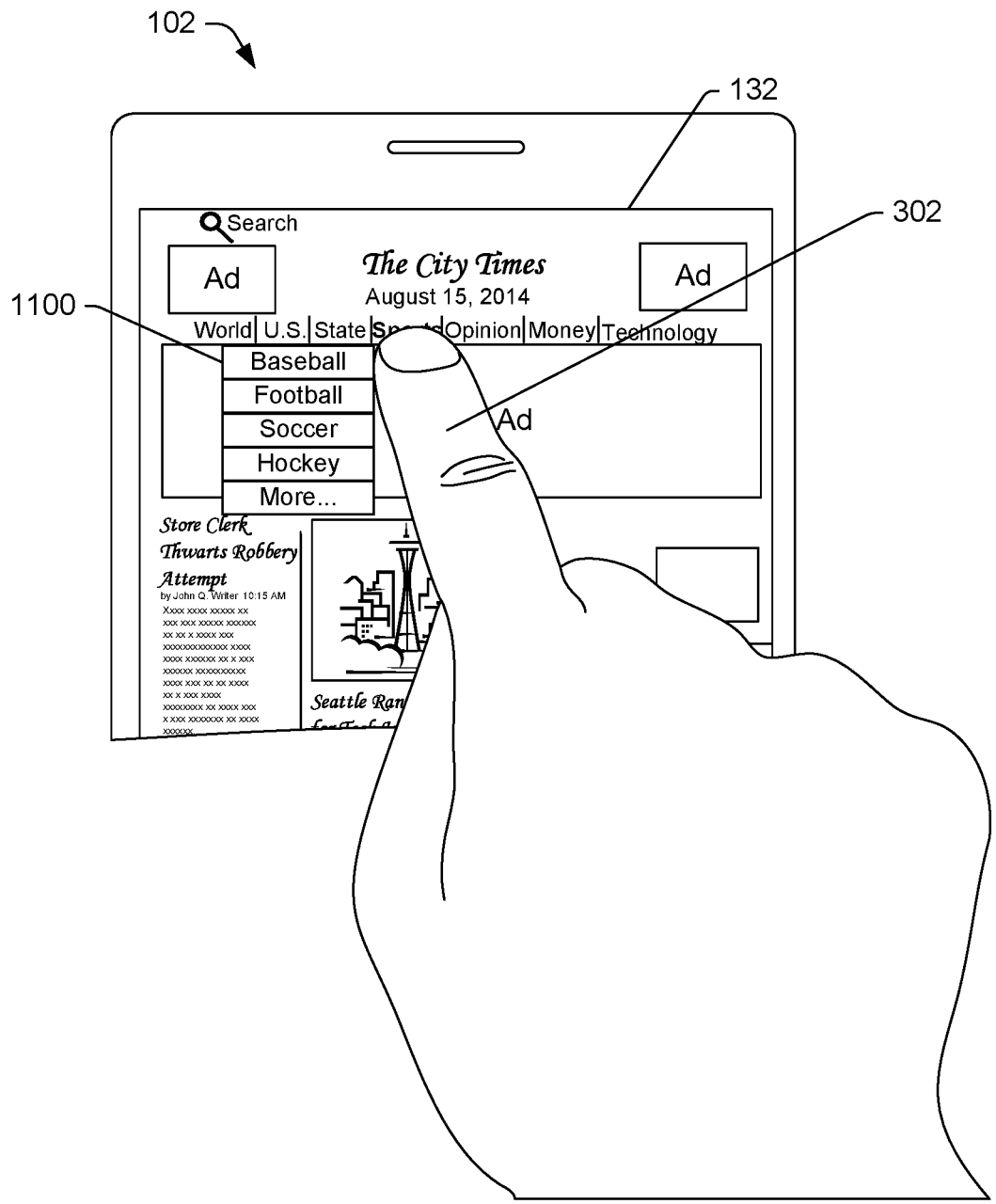
FIG. 11 illustrates a partial front elevation view of the example computing device showing the object hovering over an interactive element on the display to cause performance of a display-related function in response to the hovering object.

FIG. 11 illustrates a partial front elevation view of the computing device 102 showing the object 302 hovering over an interactive element (e.g., the menu text reading "Sports")

on the display 132 to cause performance of a display-related function in response to the hovering object 302. Specifically, portions of the content 138 may be coded to respond to hover events. In the context of a desktop computer, a hover event may occur upon the cursor being placed over an interactive element in the content with hover functionality. In the context of a hover-enabled computing device, such as the computing device 102, hover events from objects 302 may be linked to pointer events to cause display-related functions to be performed in response to detecting an object 302 hovering over the front surface 300 of the display 132.

FIG. 11 shows multiple display related functions being performed in response to a detected hovering object 302 over the "Sports" menu text. For example, the hover interface module 118 may cause the display of the interactive text reading "Sports" to transition from un-bolded font to bold font to indicate to the user that an object 302 is currently detected as hovering over the "Sports" menu text. Other display-related functions may be performed as well, such as displaying additional content 1100; in this case, a drop-down menu of subcategories for the "Sports" category.

FIG. 11 is illustrative of how the hover interface module 118 may provide full mouse/pointer support for actionable content received by the browser module 110. That is, web browsers and other content-rendering applications may be implemented in a manner that provides "desktop parity" on a hover-capable device, such as the computing device 102. For example, a small form factor smart phone may provide full mouse support to enable hover events (e.g., W3C pointer events) with rendered content when an object, such as the object 302, hovers in front of a display 132. In the illustrative example of FIG. 11, an object 302 may be hovered over the "Sports" menu text, and the menu text may be modified (e.g., bolded, highlighted, etc.) and/or additional content (e.g., a sub-category drop-down menu) may be rendered similar to how it reacts to a cursor hovering over the actionable content on a desktop computer. In this manner, all pointer events (e.g., mouseover, etc.) may be linked to hover events to enable such desktop parity on other computing devices 102. Such linking is possible in hover-capable devices due to the ability to distinguish between hover interactions and touch-based interactions from an object 302.

For further illustration, Table 1 shows an example of the primary "contact" logic that may be utilized by the hover interface module 118 to determine how to respond to an object 302 interacting with the display 132 via a combination of hover-based input and touch-based input when the magnified window 142 is not currently displayed.

TABLE 1

| Initial State | Change | Reaction |
| --- | --- | --- |
| No contacts on web browser desktop site | New Contact1 comes in range | Contact1 becomes primary |
| Contact1 is primary | New Contact2 comes in range | No reaction |
| | Contact1 is still hovering and Contact2 touches | Contact2 becomes primary |
| | Contact2 is out of range and Contact3 enters | Contact1 does not become primary but Contact3 is primary Once the primary goes away, there is no primary until a new contact comes in range |

TABLE 1-continued

| Initial State | Change | Reaction |
| --- | --- | --- |
| | | Existing contacts Never become primary Once the state returns to "No Contacts", the table becomes applicable again |

Additionally, the following are example event ordering scenarios that may be followed by the hover interface module 118 in response to various interaction between the object 302 and the display 132:

Touch Down:

Touching down on an element rendered on the front surface 300 of the display 132 may produce the following sequence of events on the hit tested node of the WM_PointerDown message: mousemove, pointerover, mouseover, mouseenter, pointerdown, mousedown.

Lifting Up:

Lifting up from an element rendered on the front surface 300 of the display 132 may produce the following sequence of events on the hit tested node of the WM_PointerUp message: pointerup, mouseup, pointerout, mouseout, mouseleave.

Moving the Contact (Object 302 Remains in-Contact):

Moving the contact on the screen while in-contact (after touching down) may produce the following sequence:

[pointerout, mouseout,] {mouseleave,}
pointermove, mousemove,
[pointerover, mouseover,] (mouseenter,)

Here, the [ ] brackets indicate events that fire when the new hit-test result is not equal the previous hit-test result. These events are fired at the previous hit-test result. The { } braces indicate events that fire when the update transitions in/out of the bounds of an element.

Moving the Contact—HOVER:

Produce coordinate updates without being in contact with the screen (near field input devices/objects). The sequence of events is as follows:

[pointerout, mouseout,] {mouseleave,}
pointerhover, mousemove,
[pointerover, mouseover,] (mouseenter,)

Moving the Contact Causing Manipulation to Begin:

When direct manipulation takes over the primary contact for the purposes of manipulation (signaled by a WM_POINTERCAPTURECHANGE message), then the following events may be dispatched: pointerout, mouseout, mouseleave, pointercancel, mouseup. Here, the "mouseup" event targets the HTML element (window).

Example Processes

Figure 12:
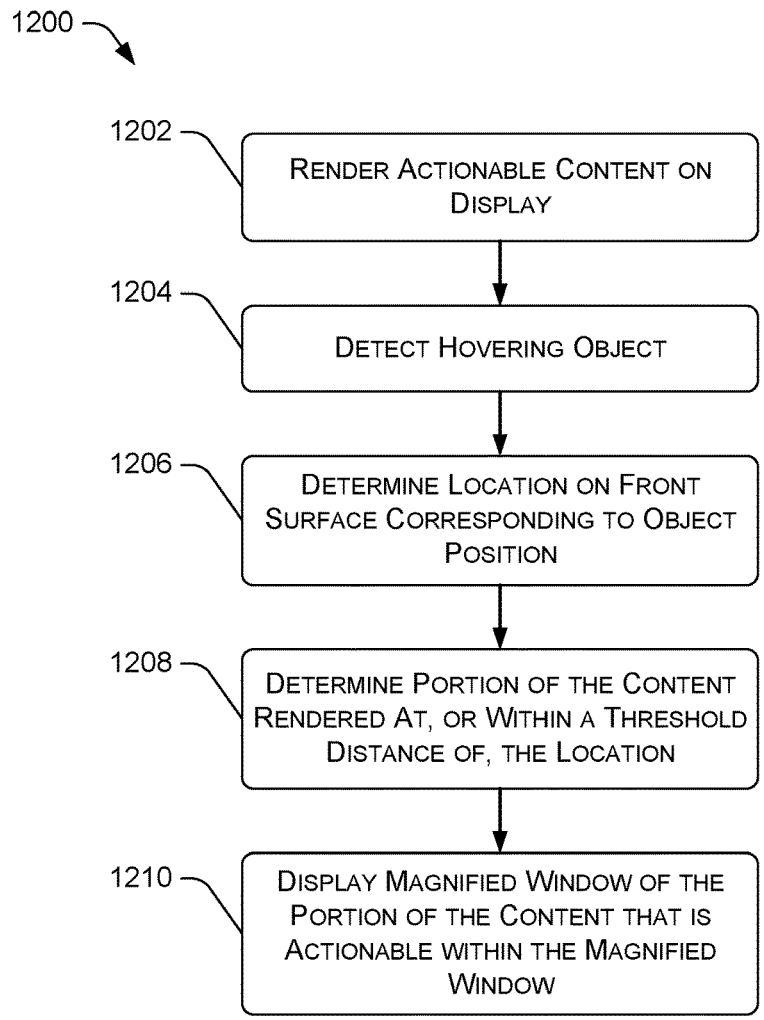
FIG. 12 is a flow diagram of an illustrative process for detecting a hovering object and, in response, displaying a magnified window with actionable content therein.
Figure 13:
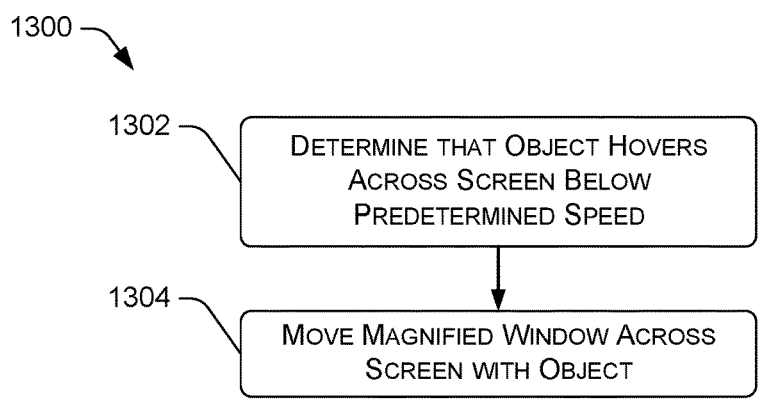
FIG. 13 is a flow diagram of an illustrative process for detecting movement of a hovering object and, in response, moving a magnified window on a display with the hovering object.
Figure 14:
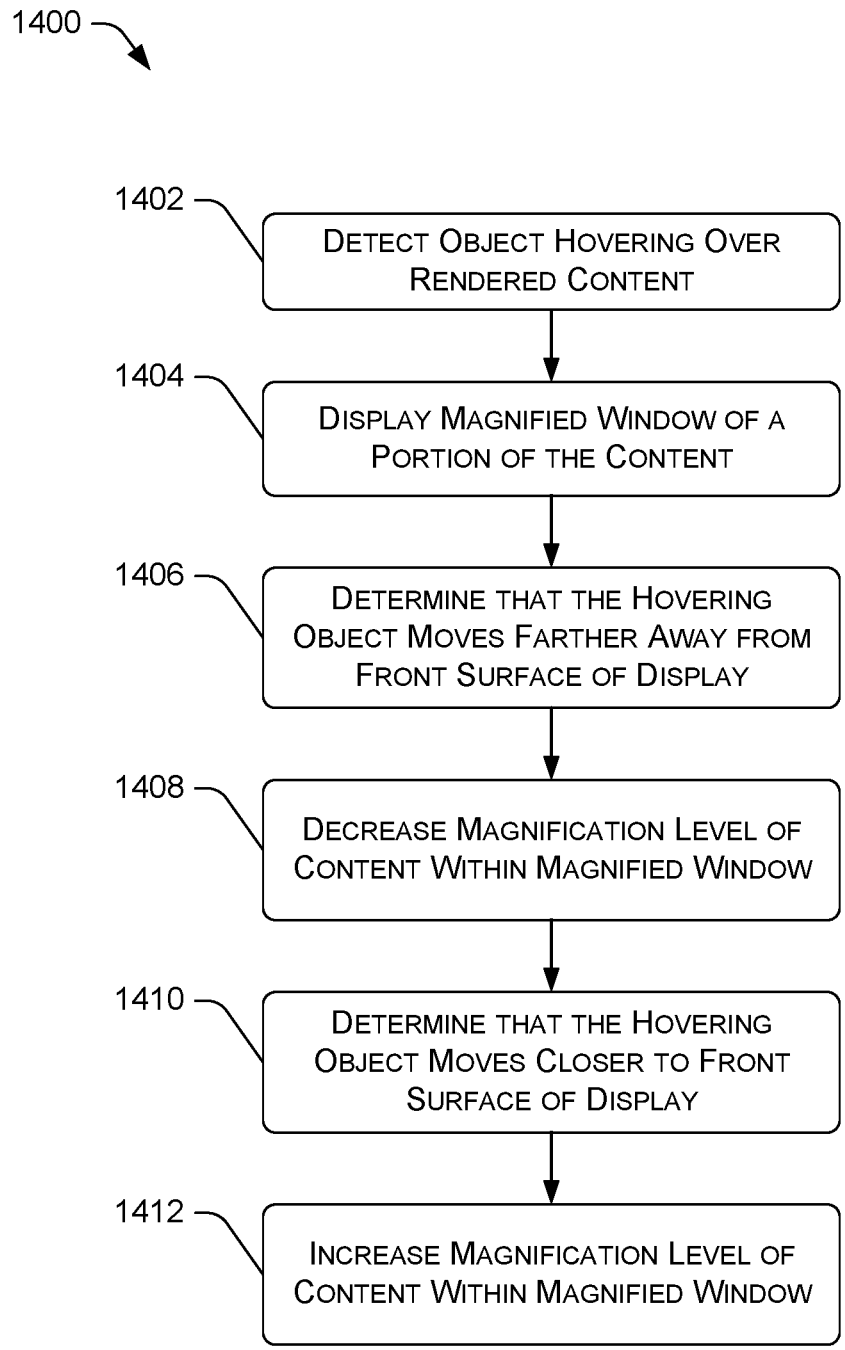
FIG. 14 is a flow diagram of an illustrative process for changing a magnification level of content within a magnified window in response to movement of an object in a direction perpendicular to a front surface of a display.

FIGS. 12, 13, and 14 illustrate processes as a collection of blocks in a logical flow graph, which represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 12 is a flow diagram of an illustrative process 1200 for detecting a hovering object 302 and, in response, displaying a magnified window 142 with actionable content therein. For discussion purposes, the process 1200 is described with reference to the computing system environment 100 of FIG. 1, and particularly the browser module 110, the hover interface module 118, the proximity sensor(s) 128, and the display(s) 132.

At 1202, the browser module 110 may render content 138 on the display 132 of the computing device 102. As described above, at least some of the content 138 may be actionable by responding to user input. For instance, the content 138 rendered on the display 132 at 1202 may comprise web page content that includes, without limitation, some or all of interactive text (e.g., selectable text), links (e.g., hyperlinks), soft buttons (e.g., video/audio playback buttons), and the like, that, in response to user input, may cause performance of a navigation function (e.g., navigating the browser to a different web page upon selection of a link), a display-related function (e.g., modifying the display of the content 138, displaying additional content, etc.), and so on.

At 1204, the proximity sensor(s) 128 may detect an object 302 hovering in front of the display 132. That is, the object 302 may be in front of, but not in contact with, a front surface 300 of the display 132 at a distance from the front surface 300 such that the proximity sensor(s) 128 may detect the object 302. In one illustrative example, the proximity sensor(s) 128 comprise a capacitive sensor array embedded within or behind the display 132, and the signal strength of the capacitive sensor array may be sufficient to detect objects 302 in proximity (e.g., within the range of about 0.001 inches to about 8 inches) to the front surface 300.

At 1206, the hover interface module 118 may determine a location 304 on the front surface 300 of the display 132 corresponding to the object's position relative to the front surface 300 of the display 132. In some embodiments, the hover interface module 118 may receive the location 304 from data obtained from the proximity sensor(s) 128 (e.g., a position of a particular electrode of the proximity sensor(s) 128). In other embodiments, the hover interface module 118 may access the program data 112 to obtain a pixel location(s) corresponding to a position of the object 132 detected by the proximity sensor(s) 128. In any case, the location 304 may be spaced a shortest distance from the object 302 relative to distances from the object 302 to other locations on the front surface 300 of the display 132. In this manner, the object's position may be resolved to the location 304 based on a direction from the object 302 to the front surface 300 of the display 132 that is perpendicular to the front surface 300.

In some embodiments, the hover interface module 118 may determine whether the location 304 is within a control area 800 of a browser so as to selectively respond to hovering objects 302 within the control area 800, but not respond to objects 302 outside of the control area 800. For example, an object 302 hovering over a navigation bar of a web browser rendered on the display 132 may be determined to be positioned outside of the control area 800. In some embodiments, the hover interface module 118 may further determine whether an input gesture is received from the object 302 when in a hover state. For example, if the object 302 remains within an area 306 surrounding the location 304 for a predetermined period of time (e.g., 50 milliseconds), it may be determined that an input gesture has been provided by the object 302.

At 1208, the hover interface module 118 may determine a portion 306 of the content 138 that is rendered at the location 304 or within a threshold distance, h, from the location 304. The portion 306 is to be displayed within a magnified window 142 for facilitating readability of the portion 306 for a user of the computing device 102. As such, the portion 306 is to correspond to the location 304 in that it is a portion of the content 138 that is in relatively close proximity to the location 304. In this sense, the portion 306 of the content 308 determined/selected at 1208 may be directly underneath the object 304 (i.e., at the location 304), or at least within a threshold distance, h, of from the location 304 (e.g., directly above the object 302, as shown in FIG. 3C).

At 1210, the hover interface module 118 may display a magnified window 142 in a region of the display that contains the portion 306 of the content. The portion 306 rendered within the magnified window 142 may be rendered in actionable form (i.e., the portion 306 within the magnified window 142 may be actionable by responding to user input when the user input is provided within the magnified window 142). The process 1200 facilitates convenient browsing of the content 138 rendered on the display 132, especially in circumstances where the content 138 is rich and dense, making readability and selectability an issue on some displays 132.

For further illustration, Table 2 shows the hover interaction logic that may be utilized by the hover interface module 118 to determine how to respond to an object 302 interacting with the display 132 via a combination of hover-based input and touch-based input.

TABLE 2

| Initial State | Change | Reaction |
| --- | --- | --- |
| No contacts on web browser desktop site, zoomed at default value | New Contact1 comes in range | Contact1 gets magnified window (display magnified window) |
| Contact1 is hovering with the magnified window and user finds interesting area of the page | Contact1 single taps | If content is actionable, browser takes the action; If there is no action, magnified window is removed/hidden and all normal browser functionalities resume as if the device is not hover-capable |
| Contact1 is hovering with the magnified window and user finds interesting area of the page | Contact1 double taps | Page is zoomed at that area as if it was pinched and zoomed on a touch screen device |
| Contact1 is hovering with the magnified window | New Contact2 comes in range | No reaction |
|  | Contact1 is still hovering and Contact2 touches | No reaction |
|  | Contact2 is out of range and Contact3 enters | No reaction |
| Contact1 is hovering with the Magnified Window | Contact1 leaves | Hide the Magnified Window |

FIG. 13 is a flow diagram of an illustrative process 1300 for detecting movement of a hovering object 302 and, in response, moving a magnified window 142 on a display 132 with the hovering object 302. For discussion purposes, the process 1300 is described with reference to the computing system environment 100 of FIG. 1, and particularly the hover interface module 118, the proximity sensor(s) 128, and the display(s) 132. The process 1300 may continue from step 1210 of the process 1200 of FIG. 12.

At 1302, the hover interface module 118 may determine that the object 302 has moved below a predetermined speed across the front surface 300 of the display 132 while maintaining a spaced relationship with the front surface 300 of the display 132. The predetermined speed may be set such that an object 302 moving too fast (e.g., at or above the predetermined speed) across the front surface 300 in a hovering manner may cause a previously displayed magnified window 142 to disappear from the display 132. In order to determine that the object 302 is moving across the front surface 300 of the display 132, the hover interface module 118 may leverage/access data from the proximity sensor(s) 128 that indicate detected locations corresponding to the object 302, and may further reference a clock or similar timer to determine a speed of the object's movement across the front surface 300.

At 1304, the hover interface module 118 may display the magnified window 142 (previously rendered in a first region of the display 132) in another region of the display 132 in response to the detected object movement at 1302. This may be performed at time intervals that make it look to the naked eye of a user like the magnified window 142 is moving with the movement of the object 302. Each new location of the object 302 may cause movement of the magnified window 142 to a new region of the display 132 at 1304. The process 1300 may allow a user to drag/move an object 302 in a spaced relationship over the front surface 300 of the display 132 to browse different portions of the rendered content 138.

FIG. 14 is a flow diagram of an illustrative process 1400 for changing a magnification level of content within a magnified window 142 in response to movement of an object 302 in a direction perpendicular to a front surface 300 of a display 132. For discussion purposes, the process 1400 is described with reference to the computing system environment 100 of FIG. 1, and particularly the hover interface module 118, the proximity sensor(s) 128, and the display(s) 132.

At 1402, the proximity sensor(s) 128 may detect an object 302 hovering in front of the display 132 that is rendering content 138. That is, the object 302 may be in front of, but not in contact with, a front surface 300 of the display 132 at a distance from the front surface 300 such that the proximity sensor(s) 128 may detect the object 302.

At 1404, the hover interface module 118 may display a magnified window 142 in a region of the display that contains a portion 306 of the content 138 in actionable form that corresponds to the position of the object 302 detected at 1402.

At 1406, the hover interface module 118 may determine (based on data received from the proximity sensor(s) 128) that the object 302 has moved farther away from the front surface 300 of the display 132 in a direction perpendicular to the front surface 300 (i.e., the z-direction shown in FIG. 3B).

At 1408, the hover interface module 118 may decrease a magnification level of the portion 306 of the content 138 within the magnified window 142 such that the magnified window 142 zooms out to reveal more of the content 138 within the magnified window 142 when the object 302 moves farther away from the front surface 300.

At 1410 the hover interface module 118 may determine (based on data received from the proximity sensor(s) 128) that the object 302 has moved closer to the front surface 300 of the display 132 in a direction perpendicular to the front surface 300 (i.e., the z-direction shown in FIG. 3B).

At 1412, the hover interface module 118 may increase the magnification level of the portion 306 of the content 138 within the magnified window 142 such that the magnified window 142 zooms in to reveal less of the content 138 within the magnified window 142 when the object 302 moves closer to the front surface 300.

The environment and individual elements described herein may of course include many other logical, programmatic, and physical components, of which those shown in the accompanying figures are merely examples that are related to the discussion herein.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Example One

A method comprising: rendering content (e.g., web content, document content, application content, etc.) on a display; detecting an object (e.g., finger, hand, pen, stylus, wand, etc.) in front of, but not in contact with, a front surface of the display; determining, at least partly in response to the detecting the object, a location on the front surface of the display that is spaced a shortest distance from the object relative to distances from the object to other locations on the front surface of the display; determining a portion of the content that is rendered at the location or within a threshold distance from the location; and displaying, in a region of the display, a magnified window of the portion of the content.

Example Two

The method of Example One, wherein the portion of the content includes one or more interactive elements comprising at least one of an embedded link, a video playback button, or an audio playback button, and wherein individual ones of the one or more interactive elements are configured to respond to user input (e.g., touch-based input, hover-based input, etc.) when the user input is provided within the magnified window.

Example Three

The method of any of the previous examples, alone or in combination, wherein the user input comprises the object contacting the front surface of the display on the individual ones of the one or more interactive elements within the magnified window.

Example Four

The method of any of the previous examples, alone or in combination, wherein the magnified window comprises a browser window rendering the portion of the content.

Example Five

The method of any of the previous examples, alone or in combination, wherein the detecting the object in front of, but not in contact with, the front surface of the display comprises determining an input gesture (e.g., the object hovering around a location for a predetermined period of time, a symbol/sign created by the object, a swiping or movement-based gesture, etc.) from the object.

Example Six

The method of any of the previous examples, alone or in combination, wherein the input gesture is determined by: detecting that the object is at a first position that is within a threshold distance from the front surface measured in a direction perpendicular to the front surface; and determining that the object is within a predetermined area of the first position for a predetermined period of time, the predetermined area being parallel to the front surface of the display.

Example Seven

The method of any of the previous examples, alone or in combination, wherein the front surface of the display comprises a top portion, a bottom portion, a left side, and a right side, a positive vertical direction pointing toward the top portion, and wherein the region includes a bottom boundary that is at a predetermined distance from the location in the positive vertical direction.

Example Eight

The method of any of the previous examples, alone or in combination, further comprising: determining that the object has moved farther away from the front surface of the display in a direction perpendicular to the front surface; and in response to the determining that the object has moved farther away from the front surface, decreasing a magnification level of the portion of the content within the magnified window.

Example Nine

The method of any of the previous examples, alone or in combination, wherein the region has a width that is no greater than about 75% of a width of the display.

Example Ten

The method of any of the previous examples, alone or in combination, wherein the location is a first location, the method further comprising: determining that the object has moved below a predetermined speed across the front surface of the display while maintaining a spaced relationship with the front surface of the display; and in response to the determining that the object has moved, moving the magnified window with the object across the front surface of the display to another region of the display, wherein the magnified window after the moving contains another portion of the content that is rendered at, or within a threshold distance from, a new location on the front surface of the display corresponding to a position of the object after having moved across the front surface of the display.

Example Eleven

The method of any of the previous examples, alone or in combination, further comprising causing the magnified view to disappear from the display in response to at least one of: (i) determining that the object moves outside of a control area (e.g., a browser control area) of the display, (ii) determining that the object moves across the front surface of the display above a predetermined speed, (iii) determining that the object contacts the front surface of the display outside of the region, or (iv) determining that the object has moved away from the front surface of the display in a direction perpendicular to the front surface of the display beyond a threshold distance from the front surface of the display measured along the direction.

Example Twelve

The method of any of the previous examples, alone or in combination, further comprising: determining that the location is within a threshold distance from a boundary of a control area (e.g., a browser control area) of the display; determining that the object has moved across the front surface of the display while maintaining a spaced relationship with the front surface of the display to a new location that is closer to the boundary of the control area relative to a distance from the location to the boundary of the control area; and in response to the determining that the object has moved to the new location, panning the portion of the content within the magnified window to reveal another portion of the content that is rendered closer to the boundary of the control area relative to a distance from the portion of the content to the boundary of the control area.

Example Thirteen

The method of any of the previous examples, alone or in combination, further comprising: detecting a first contact from the object on the front surface of the display at the location and a second contact from the object on the front surface of the display at the location, the second contact being detected within a threshold period of time from the detecting the first contact; and in response to the detecting the first contact and the second contact, rendering, on the display, a zoomed-in view of the content around the location.

Example Fourteen

A system comprising: a display configured to display content (e.g., web content, document content, application content, etc.); one or more sensors (e.g., proximity sensor (s)) configured to detect an object (e.g., finger, hand, pen, stylus, wand, etc.) in front of, but not in contact with, a front surface of the display; one or more processors; and memory storing computer-executable instructions that, when executed by the one or more processors, cause the one or more processors to perform acts comprising: determining, at least partly in response to detecting the object in front of, but not in contact with, the front surface of the display, a location on the front surface of the display that is spaced a shortest distance from the object relative to distances from the object to other locations on the front surface of the display; determining a portion of the content that is rendered at the location or within a threshold distance from the location; and causing a presentation, in a region of the display, of a magnified window of the portion of the content.

Example Fifteen

The system of Example Fourteen: wherein the portion of the content includes one or more interactive elements comprising at least one of an embedded link, a video playback button, or an audio playback button, and wherein individual ones of the one or more interactive elements are configured to respond to user input (e.g., touch-based input, hover-based input, etc.) when the user input is provided within the magnified window.

Example Sixteen

The system of any of the previous examples, alone or in combination, wherein the user input comprises the object contacting the front surface of the display on the individual ones of the one or more interactive elements within the magnified window.

Example Seventeen

The system of any of the previous examples, alone or in combination, wherein the magnified window comprises a browser window rendering the portion of the content.

Example Eighteen

The system of any of the previous examples, alone or in combination, wherein the one or more sensors are further configured to determine a distance between the front surface of the display and the object in a direction perpendicular to the front surface of the display, the acts further comprising: determining that the object has moved farther away from the front surface in the direction; and in response to the determining that the object has moved farther away from the front surface, decreasing a magnification level of the portion of the content within the magnified window.

Example Nineteen

The system of any of the previous examples, alone or in combination, wherein the location is a first location, the acts further comprising: determining that the object has moved below a predetermined speed across the front surface of the display while maintaining a spaced relationship with the front surface of the display; and in response to the determining that the object has moved, moving the magnified window with the object across the front surface of the display to another region of the display, wherein the magnified window after the moving contains another portion of the content that is rendered at, or within a threshold distance from, a new location on the front surface of the display corresponding to a position of the object after having moved across the front surface of the display.

Example Twenty

One or more computer-readable storage media comprising memory storing a plurality of programming instructions that are executable by one or more processors of a computing device to cause the computing device to perform acts comprising: rendering content (e.g., web content, document content, application content, etc.) on a display; detecting an input gesture (e.g., an object hovering around a location for a predetermined period of time, a symbol/sign created by the object, a swiping or movement-based gesture, etc.) from an object (e.g., finger, hand, pen, stylus, wand, etc.) in front of, but not in contact with, a front surface of the display; determining, at least partly in response to the detecting the input gesture, a location on the front surface of the display that is spaced a shortest distance from the object relative to distances from the object to other locations on the front surface of the display; determining a portion of the content that is rendered at the location or within a threshold distance from the location; and displaying, in a region of the display, a magnified window of the portion of the content.

Example Twenty-One

A system comprising: means for displaying content (e.g., web content, document content, application content, etc.); one or more means for detecting (e.g., a proximity sensor(s)) an object (e.g., finger, hand, pen, stylus, wand, etc.) in front of, but not in contact with, a front surface of the means for displaying; one or more means for executing computer-executable instructions (e.g., processor(s), including, for example, hardware processor(s) such as central processing units (CPUs), system on chip (SoC), etc.); and means for storing computer-executable instructions (e.g., memory, computer readable storage media such as RAM, ROM, EEPROM, flash memory, etc.) that, when executed by the one or more means for executing computer-executable instructions, cause the one or more means for executing computer-executable instructions to perform acts comprising: determining, at least partly in response to detecting the object in front of, but not in contact with, the front surface of the means for displaying, a location on the front surface of the means for displaying that is spaced a shortest distance from the object relative to distances from the object to other locations on the front surface of the means for displaying; determining a portion of the content that is rendered at the location or within a threshold distance from the location; and causing a presentation, in a region of the means for displaying, of a magnified window of the portion of the content.

Example Twenty-Two

The system of Example Twenty-One, wherein the one or more means for detecting the object are further configured to determine a distance between the front surface of the means for displaying and the object in a direction perpendicular to the front surface of the means for displaying, the acts further comprising: determining that the object has moved farther away from the front surface in the direction; and in response to the determining that the object has moved farther away from the front surface, decreasing a magnification level of the portion of the content within the magnified window.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:
1. A method comprising:
rendering content on a display;
detecting an object in front of, but not in contact with, a front surface of the display;
determining, at least partly in response to detecting the object, a location on the front surface of the display that is spaced a shortest distance from the object relative to distances from the object to other locations on the front surface of the display;
determining a portion of the content that is rendered at the location or within a threshold distance from the location;

displaying a magnified window in a region of the display, the magnified window including a magnified view of the portion of the content over the region of the display;

detecting that the object has moved within the magnified window and in front of, but not in contact with, the front surface of the display;

selecting content in response to detecting the object hovering over the selected content within the magnified window;

detecting that the object has made two successive contacts with the screen within a predetermined period of time; and performing a display-related function in response to detecting that the object has moved within the magnified window, the display-related function comprising at least one of changing an appearance of the selected content within the magnified view of the portion of the content within the magnified window, or displaying additional content within the magnified window that relates to the selected content, wherein performing the display related function further comprises zooming the display to the portion of the content within the magnified window in response to the detected two successive contacts.

2. The method of claim 1, wherein changing the appearance of the selected content within the magnified view of the portion of the content within the magnified window comprises at least one of underlining or highlighting at least some of the selected content within the magnified window.

3. The method of claim 1, wherein displaying the additional content within the magnified window comprises displaying at least one of a pop-up with the additional information, or a drop-down menu with the additional information.

4. The method of claim 1, wherein detecting the object in front of, but not in contact with, the front surface of the display comprises determining an input gesture from the object.

5. The method of claim 4, wherein the input gesture is determined by:

detecting that the object is at a first position that is within a threshold distance from the front surface measured in a direction perpendicular to the front surface; and determining that the object is within a predetermined area of the first position for a predetermined period of time, the predetermined area being parallel to the front surface of the display.

6. The method of claim 1, wherein the front surface of the display comprises a top portion, a bottom portion, a left side, and a right side, a positive vertical direction pointing toward the top portion, and wherein the region includes a bottom boundary that is at a predetermined distance from the location in the positive vertical direction.

7. The method of claim 1, further comprising:

determining that the object has moved farther away from the front surface of the display, in a direction perpendicular to the front surface; and in response to determining that the object has moved farther away from the front surface, decreasing a magnification level of the portion of the content within the magnified window.

8. The method of claim 1, further comprising causing the magnified window to disappear from the display in response to at least one of: (i) determining that the object moves outside of a control area of the display, (ii) determining that the object moves across the front surface of the display above a predetermined speed, (iii) determining that the object contacts the front surface of the display outside of the region, or (iv) determining that the object has, moved away from the front surface of the display in a direction perpendicular to the front surface of the display beyond a threshold distance from the front surface of the display measured along the direction.

9. The method of claim 1, wherein rendering content on the display comprises rendering the content in a first window, and wherein displaying the magnified window comprises rendering a second window different from the first window.

10. The method of claim 9, wherein rendering the second window comprises overlaying the second window on, top of the first window.

11. A system comprising:

a display configured to display content;

one or more sensors configured to detect an object in front of, but not in contact with, a front surface of the display;

one or more processors; and memory storing computer-executable instructions that, when executed by the one or more processors, cause the one or more processors to:

determine, at least partly in response to detecting the object in front of, but not in contact with, the front surface of the display, a location on the front surface of the display that is spaced a shortest distance from the object relative to distances from the object to other locations on the front surface of the display;

determine a portion of the content that is rendered at the location or within a threshold distance from the location;

cause a presentation of a magnified window in a region of the display, the magnified window including a magnified view of the portion of the content within the magnified window;

detect that the object has moved within the magnified window and in front of, but not in contact with, the front surface of the display;

select content in response to detecting the object hovering over the selected content within the magnified window;

detecting that the object has made two successive contacts with the screen within a predetermined period of time; and perform a display-related function in response to detecting that the object has moved within the magnified window, the display-related function comprising at least one of changing an appearance of the selected content within the magnified view of the portion of the content within the magnified window, or displaying additional content within the magnified window that relates to the selected content, wherein performing the display related function further comprises zooming the display to the portion of the content within the magnified window in response to the detected two successive contacts.

12. The system of claim 11, wherein changing the appearance of the selected content within the magnified view of the portion of the content within the magnified window comprises at least one of underlining or highlighting at least some of the selected content within the magnified window.

13. The system of claim 11, wherein displaying the additional content within the magnified window comprises displaying at least one of a pop-up with the additional information, or a drop-down menu with the additional information.

14. The system of claim 11, wherein detecting the object in front of, but not in contact with, the front surface of the display comprises determining an input gesture from the object.

15. The system of claim 14, wherein the computer-executable instructions, when executed by the one or more processors, further cause the one or more processors to determine the input gesture by:
 detecting that the object is at a first position that is within a threshold distance from the front surface measured in a direction perpendicular to the front surface; and
 determining that the object is within a predetermined area of the first position for a predetermined period of time, the predetermined area being parallel to the front surface of the display.

16. The system of claim 11, wherein the front surface of the display comprises a top portion, a bottom portion, a left side, and a right side, a positive vertical direction pointing toward the top portion, and wherein the region includes a bottom boundary that is at a predetermined distance from the location in the positive vertical direction.

17. The system of claim 11, wherein the computer-executable instructions, when executed by the one or more processors, further cause the one or more processors to:
 determine that the object has moved farther away from the front surface of the display in a direction perpendicular to the front surface; and
 in response to determining that the object has moved farther away from the front surface, decrease a magnification level of the portion of the content within the magnified window.

18. One or more computer-readable storage media comprising memory storing a plurality of programming instructions that are executable by one or more processors of a computing device to cause the computing device to perform acts comprising:
 rendering content on a display of the computing device;
 detecting an object in front of, but not in contact with, a front surface of the display;
 determining, at least partly in response to detecting the object, a location on the front surface of the display that is spaced a shortest distance from the object relative to distances from the object to other locations on the front surface of the display;
 determining a portion of the content that is rendered at the location or within a threshold distance from the location;
 displaying a magnified window in a region of the display, the magnified window including a magnified view of the portion of the content within the magnified window;
 detecting that the object has moved within the magnified window and in front of, but not in contact with, the front surface of the display;
 selecting content in response to detecting the object hovering over the selected content within the magnified window;
 detecting that the object has made two successive contacts with the screen within a predetermined period of time; and
 performing a display-related function in response to detecting that the object has moved within the magnified window, the display-related function comprising at least one of changing an appearance of the selected content within the magnified view of the portion of the content rendered within the magnified window, or displaying additional content within the magnified window that relates to the selected content,
 wherein performing the display related function further comprises zooming the display to the portion of the content within the magnified window in response to the detected two successive contacts.

19. The one or more computer-readable storage media of claim 18, wherein changing the appearance of the magnified view of the portion of the content rendered within the magnified window comprises at least one of underlining or highlighting at least some of the selected content within the magnified window.

20. The one or more computer-readable storage media of claim 18, wherein displaying the additional content within the magnified window comprises displaying at least one of a pop-up with the additional information, or a drop-down menu with the additional information.

21. The one or more computer-readable storage media of claim 18, the acts further comprising:
 determining that the object has moved farther away from the front surface of the display in a direction perpendicular to the front surface; and
 in response to determining that the object has moved farther away from the front surface, decreasing a magnification level of the portion of the content within the magnified window.

22. The one or more computer-readable storage media of claim 18, the acts further, comprising causing the magnified window to disappear from the display in response to at least one of: (i) determining that the object moves outside of a control area of the display, (ii) determining that the object moves across the front surface of the display above a predetermined speed, (iii) determining that the object contacts the front surface of the display outside of the region, or (iv) determining that the object has moved away from the front surface of the display in a direction perpendicular to the front surface of the display beyond a threshold distance from the front surface of the display measured along the direction.

* * * * *